US010885112B2

(12) United States Patent
VanderDrift

(10) Patent No.: US 10,885,112 B2
(45) Date of Patent: Jan. 5, 2021

(54) SYSTEM AND METHOD FOR NON-PROGRAMMERS TO DYNAMICALLY MANAGE MULTIPLE SETS OF XML DOCUMENT DATA

(71) Applicant: Intellectual Ventures I LLC, Wilmington, DE (US)

(72) Inventor: Richard William VanderDrift, Larkspur, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 168 days.

(21) Appl. No.: 16/056,317

(22) Filed: Aug. 6, 2018

(65) Prior Publication Data
US 2019/0034552 A1   Jan. 31, 2019

Related U.S. Application Data

(60) Continuation of application No. 14/617,503, filed on Feb. 9, 2015, now Pat. No. 10,042,955, which is a
(Continued)

(51) Int. Cl.
*G06F 16/00* (2019.01)
*G06F 16/84* (2019.01)
(Continued)

(52) U.S. Cl.
CPC ............ *G06F 16/86* (2019.01); *G06F 16/258* (2019.01); *G06F 16/289* (2019.01); *G06F 16/88* (2019.01);
(Continued)

(58) Field of Classification Search
CPC .. G06F 16/9535; G06F 16/164; G06F 16/951; G06F 16/2379; G06F 16/245;
(Continued)

(56) References Cited

U.S. PATENT DOCUMENTS 6,366,917 B1   4/2002   St. John Herbert, III
6,366,934 B1   4/2002   Cheng et al.
(Continued)

OTHER PUBLICATIONS

EF. Codd, A Relational Model of Data for Large Shared Data Banks.
(Continued)

*Primary Examiner* — Yicun Wu
(74) *Attorney, Agent, or Firm* — Knobbe, Martens, Olson & Bear, LLP

(57) ABSTRACT

A system and method for dynamically retrieving, manipulating, updating, creating, and displaying data from sources of Extensible Markup Language (XML) documents. The program memory comprises system-user entered data definitions and business rules. The system imports XML document data into the system data definitions, processes the data using the business rules definitions and exports XML documents. The system can automatically create XML document formats from its data definitions and can automatically create its data definitions from XML document formats. The system-user can also define the mapping between XML document formats and the system data definitions. The system data definition is the combination of a Relational data model, an Object data model, and an XML data model.

21 Claims, 30 Drawing Sheets

Related U.S. Application Data continuation of application No. 13/864,662, filed on Apr. 17, 2013, now abandoned, which is a continuation of application No. 13/152,810, filed on Jun. 3, 2011, now Pat. No. 8,443,012, which is a division of application No. 11/523,746, filed on Sep. 18, 2006, now Pat. No. 7,984,081, which is a continuation of application No. 09/976,710, filed on Oct. 15, 2001, now Pat. No. 7,117,220.

(51) Int. Cl.

| | | |
|---|---|---|
| G06F 16/25 | (2019.01) | |
| G06F 16/28 | (2019.01) | |
| G06F 40/103 | (2020.01) | |
| G06F 40/154 | (2020.01) | |

(52) U.S. Cl.
CPC .......... *G06F 40/103* (2020.01); *G06F 40/154* (2020.01); *Y10S 707/99931* (2013.01); *Y10S 707/99942* (2013.01); *Y10S 707/99943* (2013.01); *Y10S 707/99944* (2013.01); *Y10S 707/99945* (2013.01)

(58) Field of Classification Search
CPC ............... G06F 16/284; G06F 16/9024; G06F 16/9536; G06F 16/24544; G06F 16/24568; G06F 3/061; G06F 3/0689; G06F 9/54; G06F 12/0246; G06F 16/24549; G06F 16/907; G06F 17/18; G06F 2212/222; G06F 3/0482; G06F 3/0656; G06F 3/067; G06F 40/30; G06F 8/71; G06F 12/0253; G06F 16/119; G06F 16/13; G06F 16/134; G06F 16/182; G06F 16/183; G06F 16/219; G06F 16/2228; G06F 16/2365; G06F 16/24; G06F 16/24556; G06F 16/25; G06F 16/254; G06F 16/258; G06F 16/27; G06F 16/285; G06F 16/29; G06F 16/353; G06F 16/901; G06F 16/90335; G06F 16/9038; G06F 16/9558; G06F 16/972; G06F 19/321; G06F 21/6218; G06F 2209/548; G06F 2212/7203; G06F 2212/7207; G06F 2212/7208; G06F 30/20

See application file for complete search history.

(56) References Cited

U.S. PATENT DOCUMENTS

| | | |
|---|---|---|
| 6,446,256 B1 | 9/2002 | Hyman et al. |
| 6,502,101 B1 | 12/2002 | Verprauskus et al. |
| 6,581,062 B1 | 6/2003 | Draper et al. |
| 6,618,727 B1 | 9/2003 | Wheeler et al. |
| 6,635,089 B1 | 10/2003 | Burkett et al. |
| 6,654,737 B1 | 11/2003 | Nunez |
| 6,681,221 B1 | 1/2004 | Jacobs |
| 6,732,095 B1 | 5/2004 | Warshavsky et al. |
| 6,745,206 B2 | 6/2004 | Mandler et al. |
| 6,754,648 B1 | 6/2004 | Fittges et al. |
| 6,757,672 B2 | 6/2004 | Bird |
| 6,792,431 B2 | 9/2004 | Tamboli et al. |
| 6,799,184 B2 | 9/2004 | Bhatt et al. |
| 6,874,146 B1 | 3/2005 | Iyengar |
| 7,082,609 B2 | 7/2006 | Kappel |
| 7,117,220 B2 | 10/2006 | VanderDrift |
| 7,120,663 B2 | 10/2006 | Maesaka et al. |
| 7,181,694 B2 | 2/2007 | Reiss |
| 7,191,394 B1 | 3/2007 | Ardeleanu et al. |
| 7,984,081 B1 | 7/2011 | VanderDrift |
| 8,443,012 B2 | 5/2013 | VanderDrift |
| 2002/0013792 A1 | 1/2002 | Imielinski et al. |
| 2003/0074419 A1 | 4/2003 | VanderDrift |
| 2003/0101169 A1 | 5/2003 | Bhatt et al. |
| 2005/0055633 A1 | 3/2005 | Ali et al. |
| 2005/0278270 A1 | 12/2005 | Carr et al. |
| 2013/0232405 A1 | 9/2013 | Vanderdrift |

OTHER PUBLICATIONS

Varlamis et al., "Bridging XML-schema and relational databases: a system for generating and manipulating relational databases using valid XML documents," DocEng '01 Proceedings of the 2001 ACM Symposium on Document Engineering, Nov. 2001, pp. 105-114.
Power of Attorney, Exhibit-Paper No. 1, filed Aug. 26, 2014, in IPR2014-01385.
Petition for Inter Partes Review of U.S. Pat. No. 7,984,081, Exhibit/Paper No. 2, filed Aug. 26, 2014 in, IPR2014-01385.
Notice of Filing Date Accorded to Petition, Exhibit/Paper No. 3, filed Sep. 9, 2014, in IPR2014-01385.
Power of Attorney, Exhibit/Paper No. 4, filed Sep. 15, 2014, in IPR2014-01385.
Related Matters, Exhibit/Paper No. 5, filed Sep. 15, 2014, in IPR2014-01385.
Patent Owner Preliminary Response to Petition for Inter Partes Review, Exhibit/Paper No. 6, filed, Dec. 9, 2014, in IPR2014-01385.
Decision Institution of Inter Partes Review, Exhibit/Paper No. 7, filed Feb. 11, 2015, in IPR2014-01385.
Scheduling Order, Exhibit/Paper No. 8, filed Feb. 11, 2015, in IPR2014-01385.
IV Supplemental Mandatory Notice Adding Backup Counsel, Exhibit/Paper No. 9, filed Mar. 3, 2015, in IPR2014-01385.
Order Conduct of the Proceeding, Exhibit/Paper No. 10, filed Mar. 4, 2015, in IPR2014-01385.
Petitioners Amended Appendix of Exhibits, Exhibit/Paper No. 11, filed Mar. 6, 2015, in IPR2014-01385.
Petitioners Motion for Authorization to Compel Testimony and or Production of Documents, Exhibit/Paper No. 12, filed Mar. 11, 2015, in IPR2014-01385.
IV Opposition to IBM Motion to Compel Discovery, Exhibit/Paper No. 13, filed Mar. 17, 2015, in IPR2014-01385.
Petitioners Motion for Admission Pro Hac Vice of David H Higer, Exhibit/Paper No. 14, filed Mar. 23, 2015, in IPR2014-01385.
Order Granting Petitioners Motion for Authorization to Compel, Exhibit/Paper No. 15. filed Mar. 27, 2015, in IPR2014-01385.
Order Granting Petitioners Motion for Admission Pro Hac Vice of Mr Higer, Exhibit/Paper No. 16, filed Mar. 31, 2012, in IPR2014-01385.
Revised Scheduling Order, Exhibit/Paper No. 17, filed Apr. 1, 2015, in IPR2014-01385.
Petitioners Fourth Amended Appendix of Exhibits, Exhibit/Paper No. 18, filed Apr. 30, 2015, in IPR2014-01385.
Decision Granting Petitioner's Request to File Supplemental Evidence and Granting Patent Owners Cross Examination, Exhibit/Paper No. 19, filed May 4, 2015, in IPR2014-01385.
Petitioners Fifth Amended Appendix of Exhibits, Exhibit/Paper No. 20, filed May 6, 2015, in IPR2014-01385.
Patent Owners Request for Rehearing of the Boards May-Apr. 2015 Decision Granting Petitioner's Request to File Supplemental Evidence as Supplemental Information, Exhibit/Paper No. 21, filed May 18, 2015, in IPR2014-0138.
Patent Owners Motion for Authorization to Compel Testimony of Richard Reader, Exhibit/Paper No. 22, filed May 18, 2015, in IPR2014-01385.
Intellectual Ventures Exhibit List, Exhibit/Paper No. 23, filed May 18, 2015, in IPR2014-01385.
Power of Attorney, Exhibit/Paper No. 24, filed May 19, 2015, in IPR2014-01385.
Petitioners Amended Mandatory Notices, Exhibit/Paper No. 25, filed May 19, 2015, in IPR2014-01385.
Order Granting Patent Owners Motion for Authorization to Compel Testimony, Exhibit-Paper No. 26, filed May 27, 2015, in IPR2014-01385.

(56) References Cited

OTHER PUBLICATIONS

Petitioners Sixth Amended Appendix of Exhibits, Exhibit/Paper No. 27, filed May 27, 2015, in IPR2014-01385.
IV Notice of Cross-Exam Depo of Paul Clark, Exhibit/Paper No. 28, filed May 29, 2015, in IPR2014-01385.
IV Supplemental Mandatory Notice Adding Bridget Smith as Backup Counsel, Exhibit/Paper No. 29, filed May 29, 2015, in IPR2014-01385.
Petitioners Seventh Amended Appendix of Exhibits, Exhibit/Notice No. 30, filed Jun. 9, 2015, in IPR2014-01385.
Declaration of Paul Clark, Exhibit/Paper No. 1001, filed Aug. 26, 2014, in IPR2014-01385.
Curriculum Vitae of Paul Clark, Exhibit/Paper No. 1002, filed Aug. 26, 2014, in IPR2014-01385.
Declaration of Eugene Goryunov, Exhibit/Paper No. 1003, filed Aug. 26, 2014, in IPR2014-01385.
U.S. Pat. No. 7,984,081, Exhibit/Paper No. 1004, filed Aug. 26, 2014, in IPR2014-01385.
U.S. Pat. No. 5,445,945, VanderDrift, Exhibit/Paper No. 1005, filed Aug. 26, 2014, in IPR2014-01385.
U.S. Pat. No. 6,721,727, Chau et al., Exhibit/Paper No. 1006, filed Aug. 26, 2014, in IPR2014-01385.
U.S. Appl. No. 60/168,659, Chau et al., Exhibit/Paper No. 1007, filed Aug. 26, 2014, in IPR2014-01385.
Part 1 Oracle 8i Application Developers Guide 2000, Exhibit/Paper No. 1008, filed Aug. 26, 2014, in IPR2014-01385.
Part 2 Oracle 8i Application Developers Guide 2000, Exhibit/Paper No. 1008, filed Aug. 26, 2014, in IPR2014-01385.
Abiteboul et al., Active Views for Electronic Commerce 1999, Exhibit/Paper No. 1009, filed Aug. 26, 2014, in IPR2014-01385.
File History of U.S. Pat. No. 7,984,081, Exhibit/Paper No. 1010, filed Aug. 26, 2014, in IPR2014-01385.
USPTO Assignments on the Web for U.S. Pat. No. 7,984,081, Exhibit/Paper No. 1011, filed Aug. 26, 2014, in IPR2014-01385.
U.S. Pat. No. 7,191,394, Ardeleanu et al., Exhibit/Paper No. 1012, filed Aug. 26, 2014, in IPR2014-01385.
Cover and Table of Contents for the Proceedings of the 25$^{th}$ International Conference on Very Large Databases, Exhibit/Paper No. 1013, filed Aug. 26, 2014, in IPR2014-01385R.
Transcript of 3-3-15 Teleconference, Exhibit/Paper No. 1014, filed Mar. 6, 2015. In IPR2014-01385.
Document and Deposition Request, Exhibit/Paper No. 1015, filed Mar. 11, 2015, in IPR2014-01385.
IVs Objections to IBM Evidence, Exhibit/Paper No. 1016, filed Mar. 11, 2015, in IPR2014-01385.
Wayback Machine Archive, Exhibit/Paper No. 1017, filed Mar. 11, 2015, to IPR2014-01385.
Bertino Integrating XML and Databases, Exhibit/Paper No. 1018, filed Mar. 11, 2015, in IPR2014-01385.
Li Distributed Parallel Multi-Channel Publishing System, Exhibit/Paper No. 1019, filed Mar. 11, 2015, in IPR2014-01385.
Chaudhuri Storage and Retrieval of XML Data Using Relational Databases, Exhibit-Paper No. 1020, filed Mar. 11, 2015, in IPR2014-01385.
VLDB Program, Exhibit/Paper No. 1021, filed Mar. 11, 2015, in IPR2014-01385.
VLDB Tutorials, Exhibit/Paper No. 1022, filed Mar. 11, 2015, in IPR2014-01385.
Oracle Technology Thread No. 136217, Exhibit/Paper No. 1023, filed Mar. 11, 2015, in IPR2014-01385.
Oracle Technology Network Message No. 280645, Exhibit/Paper No. 1024, filed Mar. 11, 2015, in IPR2014-01385.
Oracle Technology Thread No. 84520, Exhibit/Paper No. 1025, filed Mar. 11, 2015, in IPR2014-01385.
Wayback Machine Archive of Technet Oracle Com, Exhibit/Paper No. 1026, filed Mar. 11, 2015, in IPR2014-01385.
Oliver LeDiouris Personal Web Page, Exhibit/Paper No. 1027, filed Mar. 11, 2015, in IPR2014-01385.
Declaration of Shelley Higgins, Exhibit/Paper No. 1028, filed Mar. 11, 2015, in IPR2014-01385.
Email from IBM to IV, Exhibit/Paper No. 1029, filed Mar. 11, 2015.
Email from IBM to Board, Exhibit/Paper No. 1030, filed Mar. 11, 2015, in IPR2014-01385.
Decision on Motion for Additional Discovery, *Garmin* v. *Cuozzo*, Exhibit/Paper No. 1031, filed Mar. 11, 2015, in IPR2014-01385.
Order on Conduct of the Proceedings, *Marvell* v. *IV*, Exhibit/Paper No. 1032, filed Mar. 11, 2015, in IPR2014-01385.
Oracle Lifetime Support Policy, Exhibit/Paper No. 1033, filed Mar. 11, 2015, in IPR2014-01385.
Oracle Lifetime Support Policies, Exhibit/Paper No. 1034, filed Mar. 11, 2015, in IPR2014-01385.
Declaration of David H. Higer, Exhibit/Paper No. 1035, filed Mar. 23, 2015, in IPR2014-01385.
Part 1 Exhibit 1036, IBM Subpoena to Oracle, Exhibit/Paper No. 1036, filed Apr. 30, 2015, in IPR2014-01385.
Part 2 Exhibit 1036, IBM Subpoena to Oracle, Exhibit/Paper No. 1036, filed Apr. 30, 2015, in IPR2014-01385.
Exhibit 1037, Certificate of Service IBM Subpoena to Oracle, Exhibit/Paper No. 1037, filed Apr. 30, 2015, in IPR2014-01385.
Exhibit 1038, RReader Declaration Apr. 21, 2015, Exhibit/Paper No. 1038, filed Apr. 30, 2015, in IPR2014-01385.
Exhibit 1039, R. Reader Declaration Apr. 21, 2015 Exhibit1, Exhibit/Paper No. 1039, filed Apr. 30, 2015, in IPR2014-01385.
Exhibit 1040, R. Reader Delcaration Apr. 21, 2015 Exhibit 2, Exhibit/Paper No. 1040, filed Apr. 30, 2015, in IPR2014-01385.
Apr. 30, 2015 Teleconference Transcript, Exhibit/Paper No. 1041, filed May 6, 2015, in IPR2014-01385.
May 22, 2014 Teleconference Transcript, Exhibit/Paper No. 1042, filed May 27, 2015, in IPR2014-01385.
Jun. 4, 2015 Deposition Transcript of Paul C. Clark, Exhibit/Paper No. 1043, filed Jun. 9, 2015, in IPR2014-01385.
Deposition Topic 1, Exhibit/Paper No. 2001, filed May 18, 2015, in IPR2014-01385.
Declaration of Eugene Goryunov, Exhibit/Paper No. 2002, filed May 18, 2015, in IPR2014-01385.
Excerpt Encycl of Microcomputers 1999, Exhibit/Paper No. 2004, filed Jun. 11, 2015, in IPR2014-01385.
Database Normalization, Wikipedia, Exhibit/Paper No. 2005, filed Jun. 11, 2015, in IPR2014-01385.
Papakonstantinou Declaration, Exhibit/Paper No. 2007, filed Jun. 11, 2015, in IPR2014-01385.
Papakonstantinou CV, Exhibit/Paper No. 2008, filed Jun. 11, 2015, in IPR2014-01385.
Patent Owner Response to Petition, Paper No. 31, filed Jun. 11, 2015 in IPR2014-01385.
IV Updated Exhibit List, Paper No. 32, filed Jun. 11, 2015 in IPR2014-01385.
Decision Denying Patent Owner's Request for Rehearing, Paper No. 33, filed Jun. 16, 2015 in IPR2014-01385.
Petitioner's Eighth Amended Appendix of Exhibits, Paper No. 34, filed Jun. 18, 2015 in IPR2014-01385.
Petitioner's Objections to Admissibility of Evidence, Exhibit No. 1044, filed Jun. 18, 2015 in IPR2014-01385.
IV Notice of Deposition of Richard Reader, Paper No. 35, filed Jul. 7, 2015 in IPR2014-01385.
Order Granting Petitioner's Request to File Mr. Reader's Corrected Declaration as Supplemental Information—37 C.F.R. 42.123(b), Paper No. 36, filed Jul. 14, 2015 in IPR2014-01385.
IV updated notice of deposition of Richard Reader, Paper No. 37, filed Jul. 22, 2015 in IPR2014-01385.
Petitioner's Notice of Deposition of Yannis Papakonstantinou, Ph.D., Paper No. 38, filed Jul. 23, 2015 in IPR2014-01385.
Petitioner's Ninth Amended Appendix of Exhibits, Paper No. 39, filed on Jul. 23, 2015 in IPR2014-01385.
Supplemental Declaration of Richard Reader, Exhibit No. 1045, filed on Jul. 23, 105 in IPR2014-01385.
IV updated exhibit list, Paper No. 40, filed on Jul. 24, 1015 in IPR2014-01385.
Transcript of Jul. 13, 2015 Conference call with PTAB, Exhibit No. 2010 in IPR2014-01385.
IV Supplemental Mandatory Notice Adding D. Jankowski as Backup Counsel, Paper No. 41, filed Jul. 30, 2015 in IPR2014-01385.

(56) References Cited

OTHER PUBLICATIONS

IV Objections to IBM Evidence Served on Jul. 23, 2015, Paper No. 42, filed Jul. 30, 2015 in IPR2014-01385.
IV Updated Exhibit List, Paper No. 43, filed on Aug. 10, 2015 in IPR2014-01385.
Transcript of Richard Reader Jul. 19, 2015 Deposition, Exhibit No. 2011, filed on Aug. 10, 2015 in IPR2014-01385.
Korth Database System Concepts, Exhibit No. 1052, filed on Aug. 18, 2015 in IPR2014-01385.
Responsive Declaration of Dr. Paul C. Clark, Exhibit 1051, filed on Aug. 18, 2015 in IPR2014-01385.
Claim Construction Hearing Transcript (Citigroup), Exhibit 1050, filed on Aug. 18, 2015 in IPR2014-01385.
Order Regarding Claim Construction (Citigroup), Exhibit 1049, filed on Aug. 18, 2015 in IPR2014-01385.
Transcript of Papakonstantinou Deposition, Exhibit 1048, filed on Aug. 18, 2015 in IPR2014-01385.
IV's Claim Construction Submission (Citigroup), Exhibit 1047, filed on Aug. 18, 2015 in IPR2014-01385.
IV's Claim Construction Brief (Capital One), Exhibit 1046, filed on Aug. 18, 2015 in IPR2014-01385.
Petitioner's Reply, Paper No. 44, filed on Aug. 18, 2015 in IPR2014-01385.
IV Objections to IBM Evidence Served on Aug. 18, 2015, Paper No. 45, filed on Aug. 25, 2015 in IPR2014-01385.
Notice of Stipulation to Change Due Dates, Paper No. 46, filed on Sep. 4, 2015 in IPR2014-01385.
IV Notice of Deposition of Paul Clark, Paper No. 47, filed on Sep. 11, 2015 in IPR2014-01385.
Memorandum Opinion re Summary Judgment, *IV* v. *Capital One*, Exhibit 1053, filed on Sep. 17, 2015 in IPR2014-01385.
Petitioner's Second Amended Mandatory Notices, Paper No. 48, filed on Sep. 17, 2015 in IPR2014-01385.
Petitioner's Third Amended Mandatory Notices, Paper No. 49, filed on Sep. 24, 2015 in IPR2014-01385.
Transcript of Paul Clark Sep. 29, 2015 Deposition, Exhibit 2018, filed on Oct. 6, 2015 in IPR2014-01385.
IV Apr. 30, 2015 Objections to IBM Evidence, Exhibit 2017, filed on Oct. 6, 2015 in IPR2014-01385.
IV Feb. 26, 2015 Objections to IBM Evidence, Exhibit 2016, filed on Oct. 6, 2015 in IPR2014-01385.
Excerpts from Oracle8i Developer's Guide, Exhibit 2015, filed on Oct. 6, 2015 in IPR2014-01385 (uploaded in 4 parts).
Oraxml 2 (2003), Exhibit 2014, filed on Oct. 6, 2015 in IPR2014-01385.
Oraxml 1 (1999), Exhibit 2013, filed on Oct. 6, 2015 in IPR2014-01385.
Sanders and Shin, Proc. 34th Hawaii Int'l Conf. on System Sciences, Exhibit 2012, filed on Oct. 6, 2015 in IPR2014-01385.
IV Motion to Exclude, Paper No. 50, filed on Oct. 6, 2015 in IPR2014-01385.
IV Request for Oral Argument, Paper No. 52, filed on Oct. 6, 2015 in IPR2014-01385.
IV Updated Exhibit List, Paper No. 51, filed on Oct. 6, 2015 in IPR2014-01385.
IV Motion for Observations on Cross-Exam, Paper No. 53, filed on Oct. 6, 2015 in IPR2014-01385.
Petitioner's Request for Oral Argument, Paper No. 54, filed on Oct. 6, 2015 in IPR2014-01385.
Order Trial Hearing, Paper No. 55, filed on Oct. 9, 2015 in IPR2014-01385.
Petitioner's Opposition to Patent Owner's Motion to Exclude, Paper No. 56, filed on Oct. 16, 2015 in IPR2014-01385.
Petitioner's Response to Patent Owner's Observations on Cross-Examination, Paper No. 57, filed on Oct. 16, 2015 in IPR2014-01385.
IV Reply to IBM Opposition to IV Motion to Exclude, Paper No. 58, filed on Oct. 23, 2015 in IPR2014-01385.
Iv Objections to IBM Demonstratives for Oral Hearing, Paper No. 59, filed on Nov. 2, 2015 in IPR2014-01385.
Petitioner's Objections to Patent Owner's Demonstrative Exhibits, Paper No. 60, filed on Nov. 2, 2015 in IPR2014-01385.
Nov. 3, 2015 Teleconference Transcript, Exhibit 1055, filed on Nov. 5, 2015 in IPR2014-01385.
Petitioner's Twelfth Appendix of Exhibits, Paper No. 62, filed on Nov. 6, 2015 in IPR2014-01385.
Record of Oral Hearing, Paper No. 63, filed on Dec. 1, 2015 in IPR2014-01385.
Final Written Decision, Paper No. 64, filed on Jan. 15, 2016 in IPR2014-01385.
Intellectual Ventures I LLC's Notice of Appeal to the U.S. Court of Appeals for the Federal Circuit of Final Written Decision of the Patent Trial and Appeal Board in Inter Partes Review. Case No. IPR2014-01385. U.S. Pat. No. 7,984,081. Dated Mar. 17, 2016.
United States Court of Appeals for the Federal Circuit. Notice Forwarding Certified List. Proceeding No. IPR2014-01385. Dated Apr. 26, 2016.
United States Court of Appeals for the Federal Circuit. Notice of Docketing. 16-1938—*Intellectual Ventures I LLC* v. *IBM*. Date of Docketing: Apr. 28, 2016. Appeal from: Patent and Trademark Office—Patent Trial and Appeal Board in Inter Partes Review No. IPR2014-01385.
United States Court of Appeals for the Federal Circuit. *Intellectual Ventures I LLC* v. *International Business Machines Corporation*. No. 16-1938. Entry of Appearance (IV). Brent R. Babcock as Principal Counsel. May 12, 2016.
United States Court of Appeals for the Federal Circuit. *Intellectual Ventures I LLC* v. *International Business Machines Corporation*. No. 16-1938. Certificate of Interest (IV). May 12, 2016.
United States Court of Appeals for the Federal Circuit. *Intellectual Ventures I LLC* v. *International Business Machines Corporation*. No. 16-1938. Docketing Statement (IV). May 12, 2016. For IPR2014-01385.
United States Court of Appeals for the Federal Circuit. *Intellectual Ventures I LLC* v. *International Business Machines Corporation*. No. 16-1938. Entry of Appearance (IV). Edward M. Cannon. May 12, 2016.
United States Court of Appeals for the Federal Circuit. *Intellectual Ventures I LLC* v. *International Business Machines Corporation*. No. 16-1938. Entry of Appearance (IV). David G. Jankowski. May 12, 2016.
United States Court of Appeals for the Federal Circuit. *Intellectual Ventures I LLC* v. *International Business Machines Corporation*. No. 16-1938. Entry of Appearance (IBM). Kenneth R. Adamo as Principal Counsel. May 12, 2016.
United States Court of Appeals for the Federal Circuit. *Intellectual Ventures I LLC* v. *International Business Machines Corporation*. No. 16-1938. Certificate of Interest (IBM). May 12, 2016.
United States Court of Appeals for the Federal Circuit. *Intellectual Ventures I LLC* v. *International Business Machines Corporation*. No. 16-1938. Docketing Statement (IBM). May 12, 2016. For IPR2014-01385.
United States Court of Appeals for the Federal Circuit.*Intellectual Ventures I LLC* v. *International Business Machines Corporation*. No. 16-1938. Entry of Appearance (IBM). David W. Higer. May 12, 2016.
United States Court of Appeals for the Federal Circuit. *Intellectual Ventures I LLC* v. *International Business Machines Corporation*. No. 16-1938. Entry of Appearance (IBM). Meredith Zinanni. May 12, 2016.
United States Court of Appeals for the Federal Circuit. *Intellectual Ventures I LLC* v. *International Business Machines Corporation*. No. 16-1938. Entry of Appearance (IBM). Eugene Goryunov. May 12, 2016.
United States Court of Appeals for the Federal Circuit. *Intellectual Ventures I Llc* V. *International Business Machines Corporation*. No. 16-1938. Entry of Appearance (lbm). Jay Emerick. May 12, 2016.
United States Court of Appeals for the Federal Circuit. *Intellectual Ventures I LLC* v. *International Business Machines Corporation*. No. 16-1938. Docket Text: Notice of Deficiency Re IBM Certificate of Interest. May 13, 2016.

(56) References Cited

OTHER PUBLICATIONS

United States Court of Appeals for the Federal Circuit. *Intellectual Ventures I LLC* v. *International Business Machines Corporation.* No. 16-1938. Corrected IBM Certificate of Interest. May 13, 2016.
United States Court of Appeals for the Federal Circuit. *Intellectual Ventures I LLC* v. *International Business Machines Corporation.* No. 16-1938. Appeal from the United States Patent and Trademark Office Patent Trial and Appeal Board. Inter Partes Review No. IPR2014-01385. Appellant's Unopposed Motion for Extension of Briefing Time; Declaration of Brenton R. Babcock in Support Thereof. May 27, 2016.
United States Court of Appeals for the Federal Circuit. *Intellectual Ventures I LLC* v. *International Business Machines Corporation.* No. 16-1938. Docket Text: Text Only Order Grant Motion to Extend Time to File Appellant's Principal Brief. May 31, 2016.
United States Court of Appeals for the Federal Circuit. *Intellectual Ventures I LLC* v. *International Business Machines Corporation.* No. 16-1938. Appeal from the United States Patent and Trademark Office Patent Trial and Appeal Board. Inter Partes Review No. IPR2014-01385. Appellee's Rule 17(F) Notice of Compliance. Jun. 10, 2016.
United States Court of Appeals, for the Federal Circuit, *Intellectual Ventures I LLC,* Appellant, v. *International Business Machines Corporation,* Appellee. Appeal from the United States Patent and Trademark Office Patent Trial and Appeal Board, Inter Partes Review No. IPR2014-001385, Brief of Appellant Intellectual Ventures I LLC. Aug. 26, 2016.
United States Court of Appeals for the Federal Circuit, 16-1938—*Intellectual Ventures I LLC* v. *IBM,* Order—Brief of Appellant Rejected. Aug. 30, 2016.
United States Court of Appeals, for the Federal Circuit, *Intellectual Ventures I LLC,* Appellant, v. *International Business Machines Corporation,* Appellee. Appeal from the United States Patent and Trademark Office Patent Trial and Appeal Board, Inter Partes Review No. IPR2014-001385, Appellant's Notice of Correction. Sep. 1, 2016.
United States Court of Appeals, for the Federal Circuit, *Intellectual Ventures I LLC,* Appellant, v. *International Business Machines Corporation,* Appellee. Appeal from the United States Patent and Trademark Office Patent Trial and Appeal Board, Inter Partes Review No. IPR2014-001385, Corrected Brief of Appellant, Intellectual Ventures I LLC. Sep. 1, 2016. Tendered.
No. 2016-1938, United States Court of Appeals, for the Federal Circuit, *Intellectual Ventures I LLC,* Appellant, v. *International Business Machines Corporation,* Appellee. Appeal from the United States Patent and Trademark Office, Patent Trial and Appeal Board, Inter Partes Review No. IPR2014-001385, Corrected Brief of Appellant, Intellectual Ventures I LLC. Sep. 1, 2016. Filed.
Docket Entry for Case 16-1938 Showing Court Receipt of 6 Paper Copies of the Corrected Opening Brief [23] Received from Appellant Intellectual Ventures I LLC. [365255]. Sep. 6, 2016.
No. 2016-1938, United States Court of Appeals for the Federal Circuit, *Intellectual Ventures I LLC,* Appellant, v. *International Business Machines Corporation,* Appellee. Appeal from the United States Patent and Trademark Office, Patent Trial and Appeal Board, IPR2014-01385, Appellee's Unopposed Motion for Extension of Time to, File Appellee's Brief. Sep. 20, 2016.
Docket Text. Order Granting Motion to Extend Time to File Appellee's Principal Brief [25] Filed by Appellee IBM. Sep. 21, 2016.
No. 2016-1938, United States Court of Appeals for the Federal Circuit, *Intellectual Ventures I LLC,* Appellant, v. *International Business Machines Corporation,* Appellee. Appeal from the United States Patent and Trademark Office, Patent Trial and Appeal Board, IPR2014-01385, Appellee's Response Brief. Dec. 5, 2016. Tendered.
No. 2016-1938, United States Court of Appeals for the Federal Circuit, *Intellectual Ventures I LLC,* Appellant, v. *International Business Machines Corporation,* Appellee. Appeal from the United States Patent and Trademark Office, Patent Trial and Appeal Board, IPR2014-01385, Appellee's Response Brief. Dec. 5, 2016. Filed.
No. 16-1938, in the United States Court of Appeals, for the Federal Circuit, *Intellectual Ventures I LLC,* Appellant, v. *International Business Machines Corporation,* Appellee. Appeal from the United States Patent and Trademark Office Patent Trial and Appeal Board, Inter Partes Review No. IPR2014-01385, Appellant's Unopposed Motion for Extension of Briefing, Time; Declaration of Brenton R. Babcock in Support Thereof. Dec. 12, 2016.
Docket Text. Order Granting Motion to Extend Time to File Reply Brief [29] Filed by Appellant Intellectual Ventures I LLC. Dec. 13, 2016.
United States Court of Appeals. For the Federal Circuit. *Intellectual Ventures I LLC.* Appellant, v. *International Business Machines Corporation,* Appellee. Appeal From the United States Patent and Trademark Office Patent Trial and Appeal Board Inter Partes Review No. IPR2014-001385 Reply Brief of Appellant Intellectual Ventures I LLC. Jan. 18, 2017.
United States Court of Appeals. For the Federal Circuit. *Intellectual Ventures I LLC,* Appellant, v. *International Business Machines Corporation,* Appellee. Appeal From the United States Patent and Trademark Office Patent Trial and Appeal Board Inter Partes Review IPR2014-01385 Joint Appendix [vol. 1 of 1]. Jan. 25, 2017.
United States Court of Appeals. For the Federal Circuit. *Intellectual Ventures I LLC,* Appellant, v. *International Business Machines Corporation,* Appellee. Appeal From the United States Patent and Trademark Office Patent Trial and Appeal Board Inter Partes Review IPR2014-001385 Appellant's Statement of Compliance With Fed. Cir. R. 17(f). Jan. 25, 2017.
United States Court of Appeals. For the Federal Circuit *Intellectual Ventures I LLC,* Appellant, v. *International Business Machines Corporation,* Appellee. Appeal From the United States Patent and Trademark Office Patent Trial and Appeal Board Inter Partes Review IPR2014-001385 Joint Statement of Compliance With Fed. Cir. R. 33(a). Jan. 25, 2017.
United States Court of Appeals for the Federal Circuit. Notice of Docket Activity. 16-1938-CB *Intellectual Ventures I LLC* v. *IBM* "Notice to Submit Argument Scheduling Conflicts" Jan. 30, 2017.
Selected docket entries for case 16-1938. 6 paper the Reply Brief [33] received from Appellant Intellectual Ventures I LLC. [403909]. Filed Feb. 1, 2017.
Notice of Potential Conflict with Argument Dates. *Intellectual Ventures I LLC* v. *International Business Machines Corp.* Case: 16-1938. Feb. 6, 2017.
United States Court of Appeals for the Federal Circuit. Notice of Docket Activity. 16-1938-CB *Intellectual Ventures I LLC* v. *IBM* "Issue Argument Notice of Calendaring (case)" Apr. 21, 2017.
United States Court of Appeals for the Federal Circuit Oral Argument Order. Apr. 21, 2017.
United States Court of Appeals. For the Federal Circuit *Intellectual Ventures I LLC,* Appellant, v. *International Business Machines Corporation,* Appellee. Appeal From the United States Patent and Trademark Office Patent Trial and Appeal Board Inter Partes Review No. IPR2014-001385 Appellant Intellectual Ventures I LLC's Unopposed Motion to Voluntarily Dismiss Appeal. Apr. 27, 2017.
United States Court of Appeals for the Federal Circuit. *Intellectual Ventures I LLC,* Appellant v. *International Business Machines Corporation,* Appellee 2016-1938. Appeal from the United States Patent and Trademark Office, Patent Trial and Appeal Board in No. IPR2014-01385. On Motion. Order Granting Motion to Terminate Appeal. May 3, 2017.

SYSTEM AND METHOD FOR NON-PROGRAMMERS TO DYNAMICALLY MANAGE MULTIPLE SETS OF XML DOCUMENT DATA

CROSS REFERENCE TO RELATED APPLICATIONS

This application is a continuation of U.S. patent application Ser. No. 14/617,503 filed Feb. 9, 2015, which is a continuation of U.S. patent application Ser. No. 13/864,662 filed Apr. 17, 2013, which is a continuation of U.S. patent application Ser. No. 13/152,810 filed Jun. 3, 2011 and issued as U.S. Pat. No. 8,443,012 on May 14, 2013, which is a divisional of U.S. patent application Ser. No. 11/523,746 filed Sep. 18, 2006 and issued as U.S. Pat. No. 7,984,081 on Jul. 19, 2011, which is a continuation of U.S. patent application Ser. No. 09/976,710 filed Oct. 15, 2001, and issued as U.S. Pat. No. 7,117,220 on Oct. 3, 2006. Each of these prior applications is hereby incorporated by reference in its entirety.

TECHNICAL FIELD

The present invention relates generally to systems and methods for interfacing with and using Extensible Markup Language (XML) documents; still more particularly, the present invention relates to systems and methods that allow the non-programmer to easily modify the display format, functions, and filters operating upon data extracted from XML documents.

BACKGROUND

Companies use XML documents to publish various types of information for use by customers and partners. The type of information in such XML documents is frequently common transactions such as invoices and purchase orders and common reference documents such as customer profiles and price lists. Computer programmers design these XML document formats in a technical manner. People and programs that extract data from corporate databases typically create the XML documents containing actual data.

While XML formats are convenient for the company that creates them, the partners of that company may find them incompatible with their own XML formats, relational database schemes, and message formats and therefore difficult to work with. In many cases, the user is forced to have programmer create a program (typically transforming the XML data into an object model for manipulation by the program) to merge, filter and transform XML documents into the format they want. Thus, XML documents are very difficult for the businessperson or nontechnical user to operate. Therefore, there is a need for a system that both allows the user to view and update XML documents in different formats, and allows the user to manipulate the data and perform actions without programming skills.

SUMMARY

The present invention overcomes the limitations and shortcomings of the prior art with a system and methods for dynamically retrieving, manipulating, updating, creating, and displaying data from sources of Extensible Markup Language (XML) documents comprises a central processing unit, an input device, a program memory, a display device, mass storage, and a network. The program memory comprises system-user entered data definitions and business rules. The system imports XML document data into the system data definitions (an integrated combination of Relational and Object), processes the data using the business rules definitions and exports XML documents. The system can automatically create XML document formats from its data definitions and can automatically create its data definitions from XML document formats; the system-user can also define the mapping between XML document formats and the system data definitions. The system data definition is the combination of a Relational data model, an Object data model, and an XML data model.

The system has three major data types: primary record types (PRTs), management record types (MRT), and dynamic documents (DD). A PRT is similar to a relational database table—the Relational data model; they contain most of the data. A MRT is a grouping of PRTs; they contain pointers to individual PRT records and some calculated data—the Object data model. A DD is a restructuring of a set of MRT instances for analysis and presentation. It is the map that creates XML data for display or export of data in the Relational (PRT) and Object (MRT) data models; they contain pointers to the MRT components and some calculated data. The system's data structure is much more sophisticated than that of a relational database, and object model, or a set of XML documents. Unlike a relational database, the business rules can use the complex data relationships of the MRTs and DDs, and system-users can easily define views of the data that do not conform to the constraints of the relational data model. Unlike a set of XML documents, the system-user can easily merge data from multiple XML document formats. Also the system stores only one instance of duplicate XML components; manipulating the one instance automatically affects all XML documents that include that instance.

DETAILED DESCRIPTION OF ILLUSTRATIVE EMBODIMENTS

Figure 1:
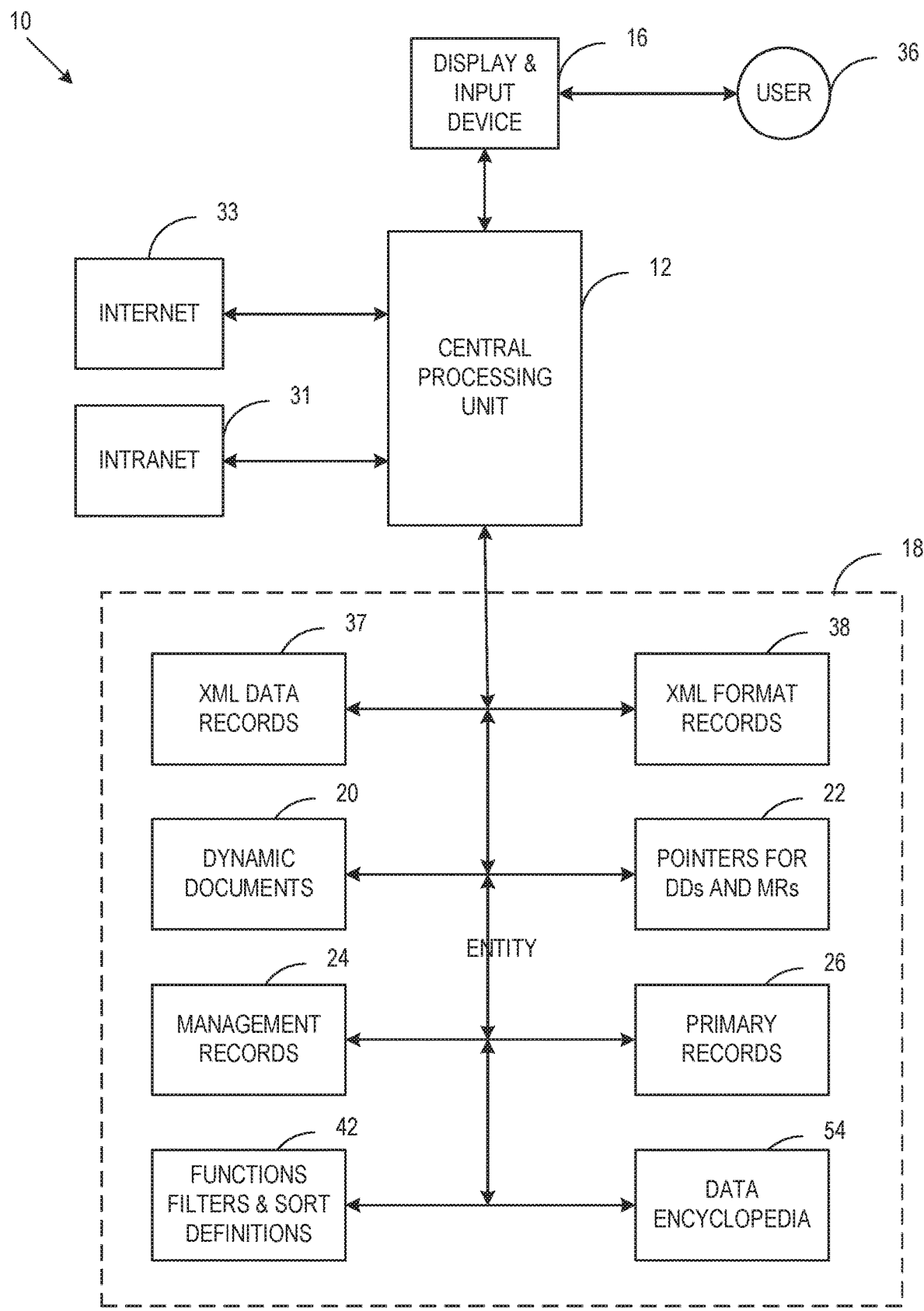
FIG. 1 is a block diagram of a preferred embodiment of the system for extracting and dynamically displaying data in accordance with the present invention.

In accordance with the present invention, a system for dynamically retrieving, manipulating, updating, creating, and displaying data from sources of Extensible Markup Language (XML) documents is shown in FIG. 1. A central processing unit (CPU) 12 connects with a display and input device 16 and a program memory 18. The CPU 12 is also coupled to the Internet 33 and an intranet 31 in a conventional manner. XML documents 37 fetched from the Internet 33 and intranets 31 are temporarily stored until they are converted into Primary Record Types (PRTs) 26 and Management Record Types (MRTs) 24. The system 10 also creates XML documents 37 that it exports to the Internet 33 and intranets 31 in a conventional manner.

The memory 18 also stores a Dynamic Document (DD) 20, a MRT 24, pointers for constructing and displaying DDs and MRTs 24, and functions, filters & sorts 42 along with an operating system. The CPU 12, under the guidance of instructions received from the program memory 18, imported XML formats 38, and from the user through the input device 16, creates MRTs 24 and DDs 20, XML documents 37, and XML formats 38 and displays data on the display device 16. The methods of the present invention preferably extract data from the Internet 33 and intranets 31, perform functions and filters on the data, and store the extracted data as PRTs 26 in the program memory 18. The MRTs 24 are then further processed with other routines in memory 18 to be displayed as DDs 20 that include a user interface to display information on the display 14. Those skilled in the art will be aware that various equivalent combinations of devices can achieve the same results when used in accordance with the present invention.

Figure 2:
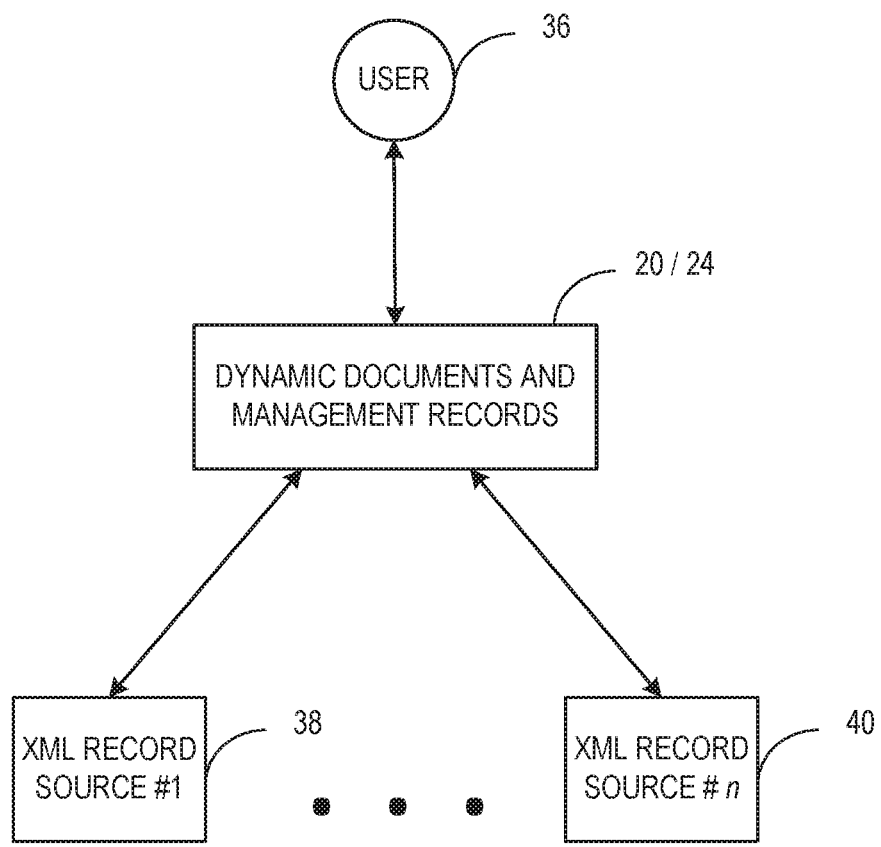
FIG. 2 is a graphical representation illustrating the context in which the system and methods of the present invention operate.

Referring now to FIG. 2, the context in which the system and methods of the present invention operate will be described. As has been noted above, the present invention overcomes the problems associated with presently available tools for non programmers to easily modify the display format, functions, and filters operating upon information extracted from XML documents 37, In particular, the present invention removes the problems of interfacing with and analyzing data from XML documents 37 by providing DDs 20 and MRTs 24. A DD 20 is a mechanism for displaying, manipulating, and printing MRTs, and for mapping how changes to the MRTs should update one or more XML documents. The DDs provide user interfaces as well as display and organization rules for displaying the data to the user 36. In the preferred embodiment, a DD 20 has the form of window on the display device 16 with a hierarchy of display panes. Each pane is used to display one or more or the PRTs that comprise a MRT. The present invention also includes procedures for entering data changes using DDs. As will be described, the process for modifying data with DDs is very simple for the user. A change entered with a DD automatically updates the MRTs to update other related MRTs and updates and create XML documents.

The present invention interfaces with the underlying XML documents by copying the XML data components into normalized data objects referred to as PRTs and organizing the PRTs into recognizable business objects referred to as MRTs 24. Examples of business objects that are modeled as MRTs with the present invention include, but are not limited to: invoices, bills of material, purchase orders, price books, forecasts, and fund transactions, The present invention advantageously works in conjunction with underlying data sources 38, 40 to reconstitute data stored therein into a structure recognizable and easily manipulated by the businessperson. The user can define functions (calculations), filters (selection criteria), sorts, and DDs (display and organization rules) over MRTs.

Figure 3:
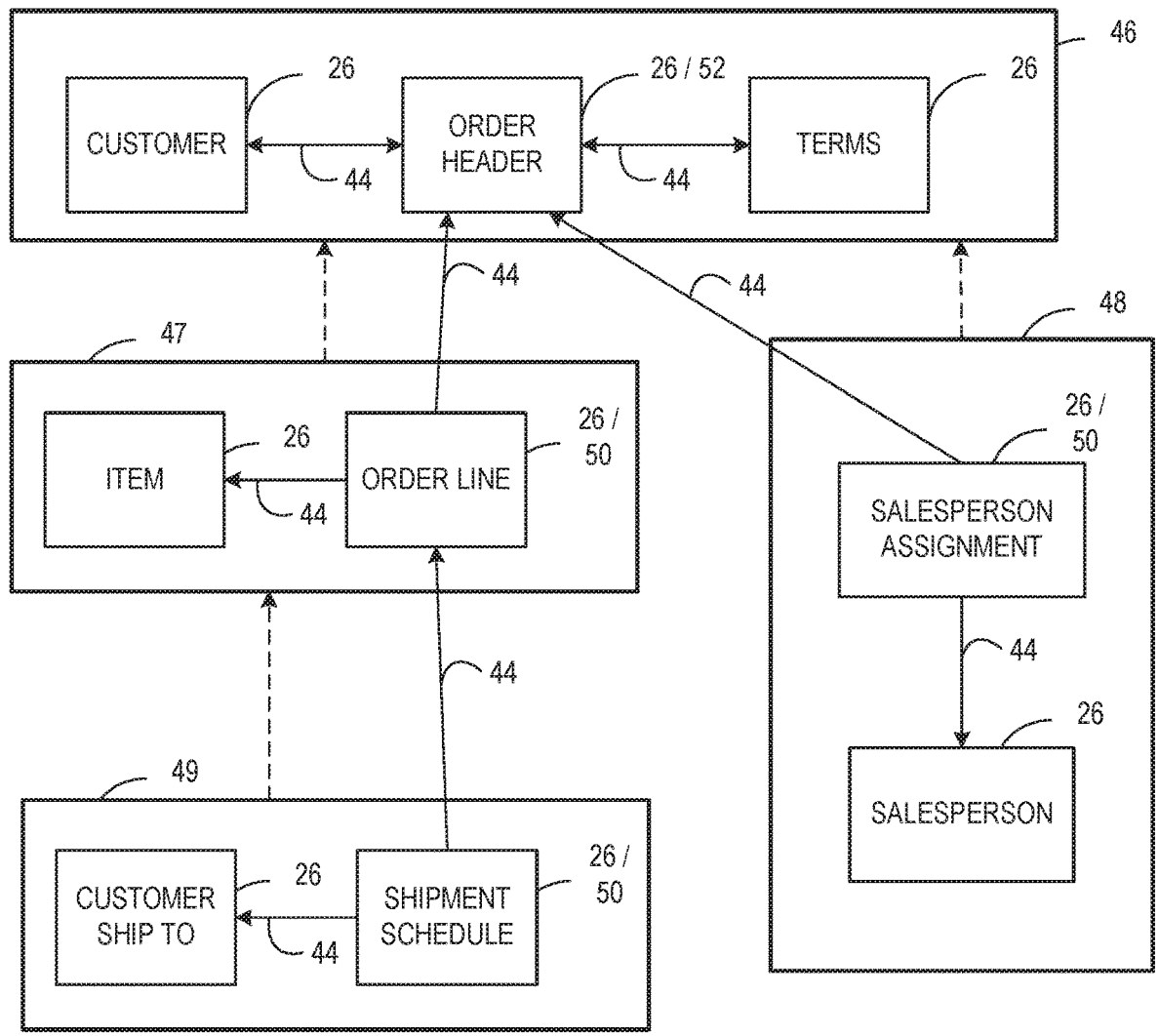
FIG. 3 is a graphical representation of an exemplary embodiment for a management record.

A MRT is a user-defined collection of PRTs organized into a hierarchy. One and only one of the PRTs uniquely define a node in the hierarchy. A single instance of a PRT results in a single instance of a MRT hierarchy node. A single instance of the PRT assigned to the top hierarchy node results in a single instance of the MRT. An instance of an MRT is a Management Record Pointer Family (MRPF) 90. In the example of FIG. 3, the Order Header is 23 the PRT that uniquely defines the MRT. A PRT is where the invention stores the data extracted 24 from XML documents; PRTs are similar to relational database tables. A "hook" 44 refers to the 25 method used for linking or showing relationships between records stored in different PRTs. Such 26 hooks include pointers and foreign keys. A hook typically provides a one to many relationship 27 between a parent record and a child record. As shown in FIG. 3, the hooks are represented by 28 lines where a single occurrence of a connecting line attaches to the parent, and multiple 29 occurrence of the connecting line attach to child. A hook not only specifies which fields of a 30 PRT point to which fields of another PRT, but also specifies the number of hooks any particular instance of one PRT can and must have with the instances of the other PRT.

It should be understood that PRTs are unlike XML components. First an XML component instances are not shared with other XML document instances. In other words, two XML documents may have identical values in all its elements. Unlike XML components, no two PRTs have identical values in the fields that uniquely identify a PRI. Second an XML component type has at most one parent component type where as a PRT can have multiple parent PRTs. It should be understood that MRTs are different than XML documents. First, a MRT can be comprised of multiple XML documents; for example a MRT can incorporate the data in both an Order XML document, and Customer XML document, and Product XML document. Second unlike an XML document, a MRT does not have any redundant data. For example an Open Orders XML document would contain duplicate customer information for every order for the same customer and duplicate product information on every order line for the same product, A MRT does not actually include the customer and product data but has a pointer to the single instance of data for each customer and each product. MRTs require less storage space than XML documents and when users change the product information and it is immediately reflected in all MRTs that point to the changed product.

MRTs also have significant advantages XML documents elements, and object database composite objects. A system administrator predetermines hierarchies of XML documents and object-oriented databases, typically. The users manually maintain the pointers between the individual records. Family trees (which do not show spouses) are examples of hierarchies. The relationships are rigid and only movement from parent to child and visa versa is permitted. Any new hierarchy is empty until parent and child records are explicitly linked to each other either manually or by writing a custom program to build the links. MRTs, on the other hand, automatically populate a hierarchy of PRTs using PRT hooks 81 according to definitions set by the user.

Also, unlike in an XML document component hierarchy where relationships are rigid, a parent PRT can be the child node in a MRT hierarchy. For example in FIG. 3, customer order header is typically a child component to a customer component but with the present invention, the user can define a customer order MRT where the customer order header is the parent. In this example, the customer order header is the top node for this MRT while the customer is a single occurrence child.

FIG. 3 illustrates an example of the pointer structure of the present invention that is used with the MRT 24. The pointer structure is preferably used to improve the speed for processing filters, sorts and functions. As has been noted above, one PRT 52, in this case order header, is used to uniquely identify the MRT 24. Each PRT 26 is linked either directly or indirectly by hooks 44 to the order header PRT. The present invention also produces pointer families 46-49 to divide the PRTs 26 in the MRT 24 into groups. Each of the management record pointer families (MRPF) has a lead PRT 50 that directly or indirectly through another lead PRT 50 has a many to one relationship with the unique identifying PRT 24. The PRTs that have a one to many relationship 44 with a lead PRT 50 or the one PRT 52 are included in the PRT pointer family 46-49. The example of FIG. 3 will be used below to illustrate the operations performed by the present invention on MRTs 24.

Referring now to FIG. 4, an overview of the preferred method of the present invention is described. The preferred method begins with a series of steps in which the user inputs defining information described in FIG. 4A. In step 80, the user defines or imports the XML format. In step 81 the invention creates PRTs by identifying the XML format components that have at least one child component. When the PRT already exists, the user maps the XML format components to the data elements of the already existing PRT.

In step 82, the invention creates hooks between every PRT that it creates and the XML component and the PRT it creates for its immediate parent XML component. The user can also define hook definitions between two PRTs by specifying the fields in the child PRT that corresponds to the unique identifying fields of the parent PRT. Next in step the invention creates the MRT definition and its Management Record Pointer Family (MRPF) as described in FIG. 5. To manually create a MRT, the user selects a first PRT. After the user selects the PRT, the system presents the user with a list of all PRTs that have a hook with the first PRT or any PRTs in the list. The user then selects any of the listed PRT for inclusion in the MRT. After the user has completed selection of PRTs, the user specifies which one of the PRTs selected is the unique identifier for this MRT.

Next, in step 83, the invention creates a DD for the XML format as defined in FIG. 5B. In step 84, the user can manually enter additional DDs. The user can now enter definitions for the rules that manipulate the data in the MRTs and DDs. Enter definitions for functions in step 85, for filters in step for 86, and for sorts in step 87. The methods used for defining these definitions are similar to those typically used in the art.

Figure 4A:
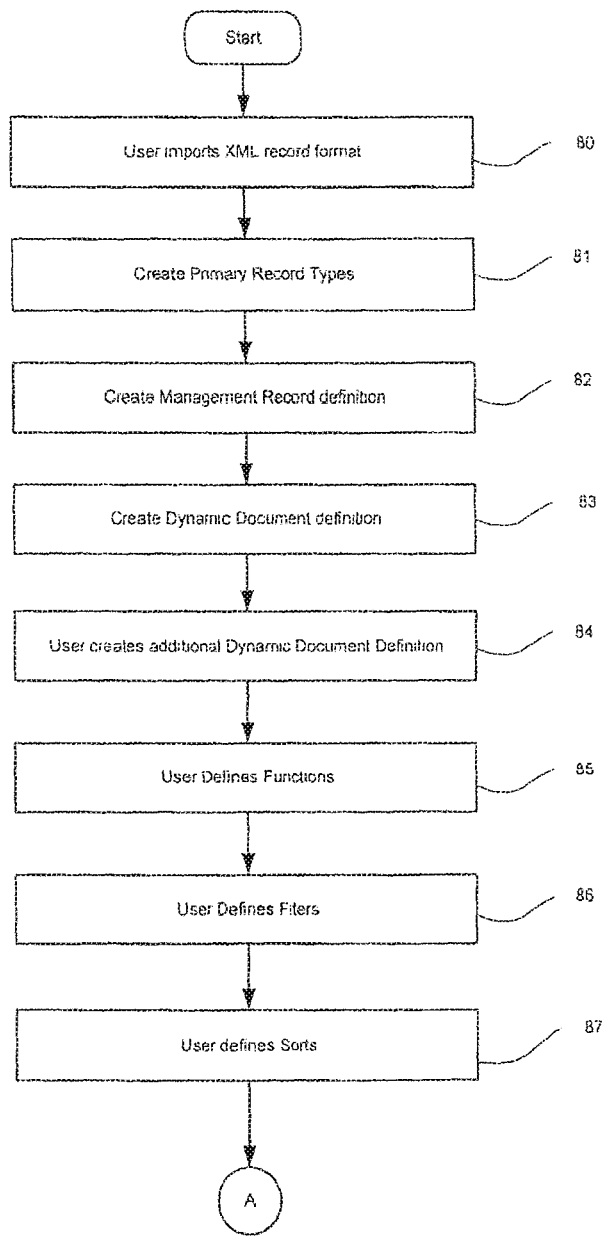
FIGS. 4A, 4B, 4C, and 4D are a flowchart of an overview of the preferred method for initializing and operating the system in accordance with the methods of present invention.
Figure 4B:
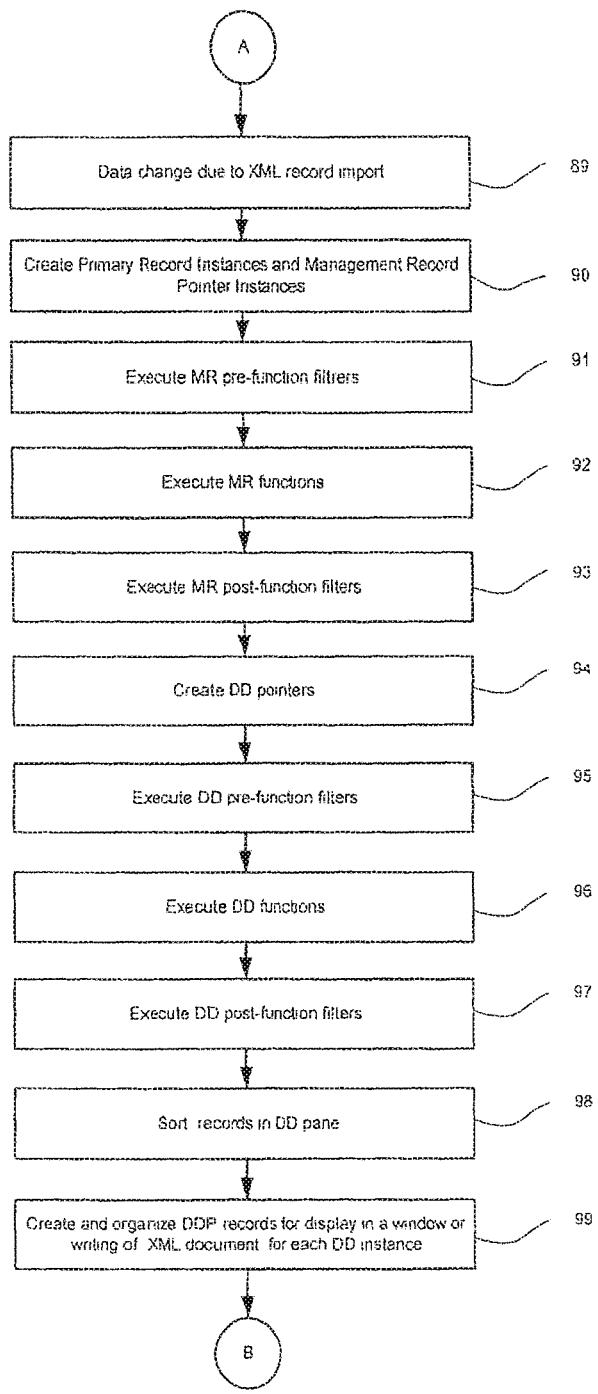

In FIG. 4B, an overview of the preferred method for managing the import and processing of new XML documents is described. In step 89, a user imports an XML document of a format previously imported into the invention. In step 90, the invention creates the PRIs and Management Record Pointer Instances (MRPIs) as described in FIG. 6 below. The preferred method, in step 91, next executes MRT pre-function filters on the fetched data, as discussed below with reference to FIG. 8. Then in step 92, the MRT functions are executed using the fetched and filtered data as described in FIG. 7 below. Next in step 93, MRT post-function filters are executed. These filters are executed with a similar process used in step 91. Now that the data from the data sources has been retrieved, the preferred method creates dynamic document pointers (DDP) for displaying the data in step 94 (See FIG. 9 and discussion below). As with MRTs, pre-function filters (See FIG. 18 and discussion below), functions (See FIG. 16 and discussion below), post-function filters, and sorts are executed in steps 95, 96, 97, and 98, respectively. Then in step 98, the dynamic document pointer's (DDP's) calculated fields, MRPF's calculated fields, and the PRIs are organized into panes and records for display in a window or for writing of XML document for each DD instance.

Figure 4C:
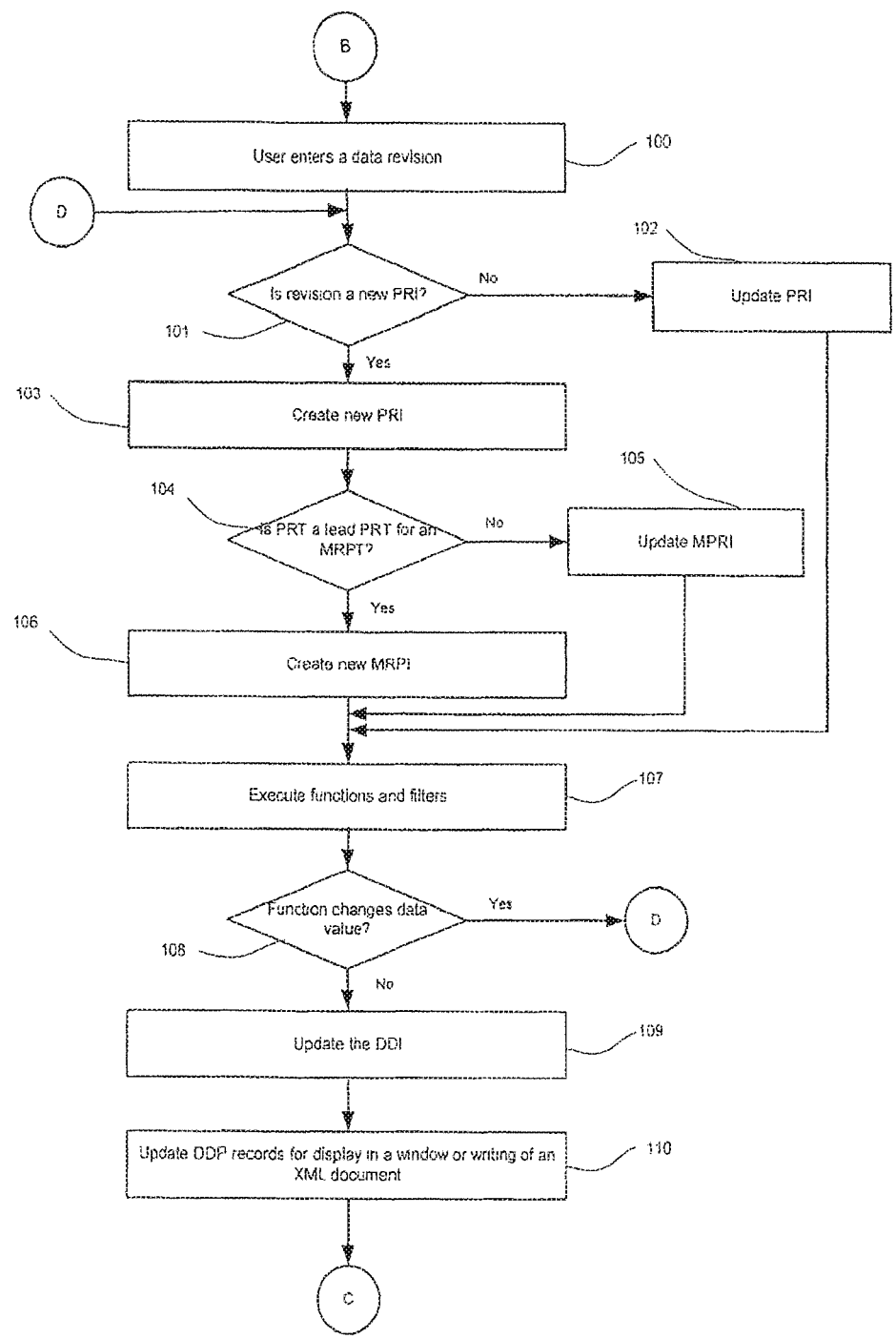

In FIG. 4C, an overview of the preferred method for managing the processing of data changes entered by users is described. The user can now enter revisions to update the data using the DD displays in step 100. In step 101, the method first determines whether the change includes a new PRI record because the user entered new unique identifier values for the affected PRT. If change is not a new PRI, step 102 updates the existing affected PRI. If a new PRI is required step 103 created the new PRI, and step 104 determines if the PRIs PRT is the lead PRT for a Management Record Pointer Family. If it is not a lead PRT, step 105 updates the appropriate MPRI to now include the new PRI. While if it is a new lead PRT, step 106 creates the new MRPI. Next, in step 107, the present invention executes the functions and filters for the revision. If any of the functions changes data values, step 108 sends those revisions to step 101 to be processed in the same manner as user entered revisions. If the functions produced no data revisions, step 109 follows where the DDs 20 are updated to reflect the revision. Then in step 110, the method updates DDP records for display in a window or writing of an XML document.

Figure 4D:
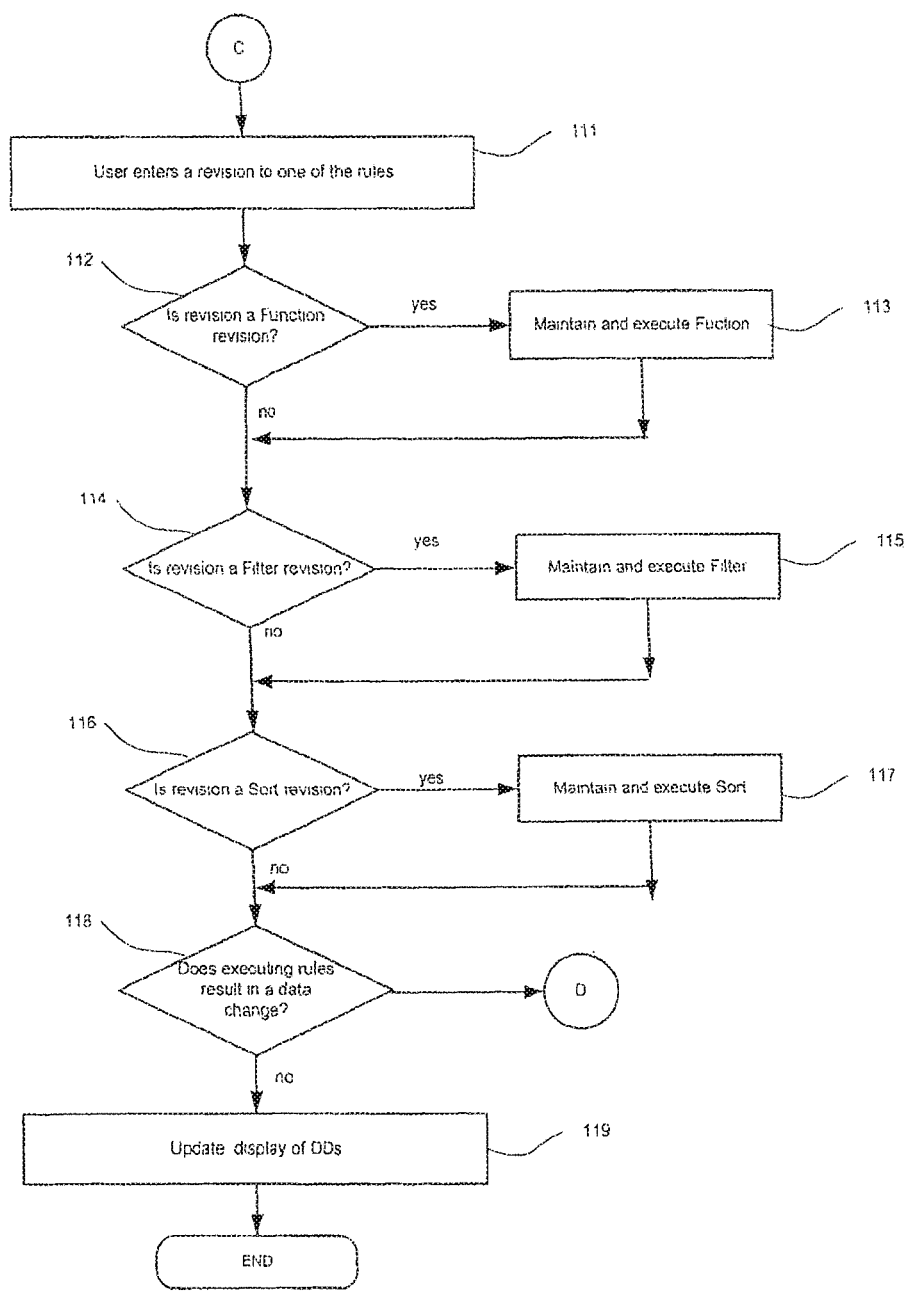

In FIG. 4D, an overview of the preferred method for managing user changes to processing rules is described. In step 111, the user enters a change to one of the rules that manage the data. In step 112 the preferred method tests whether the revision is a function revision. If not, the process continues to step 114. However, if the revision is a function revision, the function is executed with the revision in step 113, and as described below with reference to FIG. 13. In step 114, the preferred method determines whether the revision is a filter revision. If not, the process continues to step 116. However, if the revision is a filter revision, the filter is reexecuted using the revision in step 115, and as described below with reference to FIG. 14. Then in step 116, the preferred method test whether the revision is a sort revision. If not, the method continues to step 118. However, if the revision is a sort revision, the sort is executed in step 117. In step 118, the preferred method tests if processing the revision as described above resulted in revisions to data. If there are, the method loops to step 101. If the revision did not generate other revisions, the method moves to step 119 where it updates the display of the DDs to reflect changes to the sequence of data and the inclusion or omission of data affected by the changes to the filter criteria.

Figure 5:
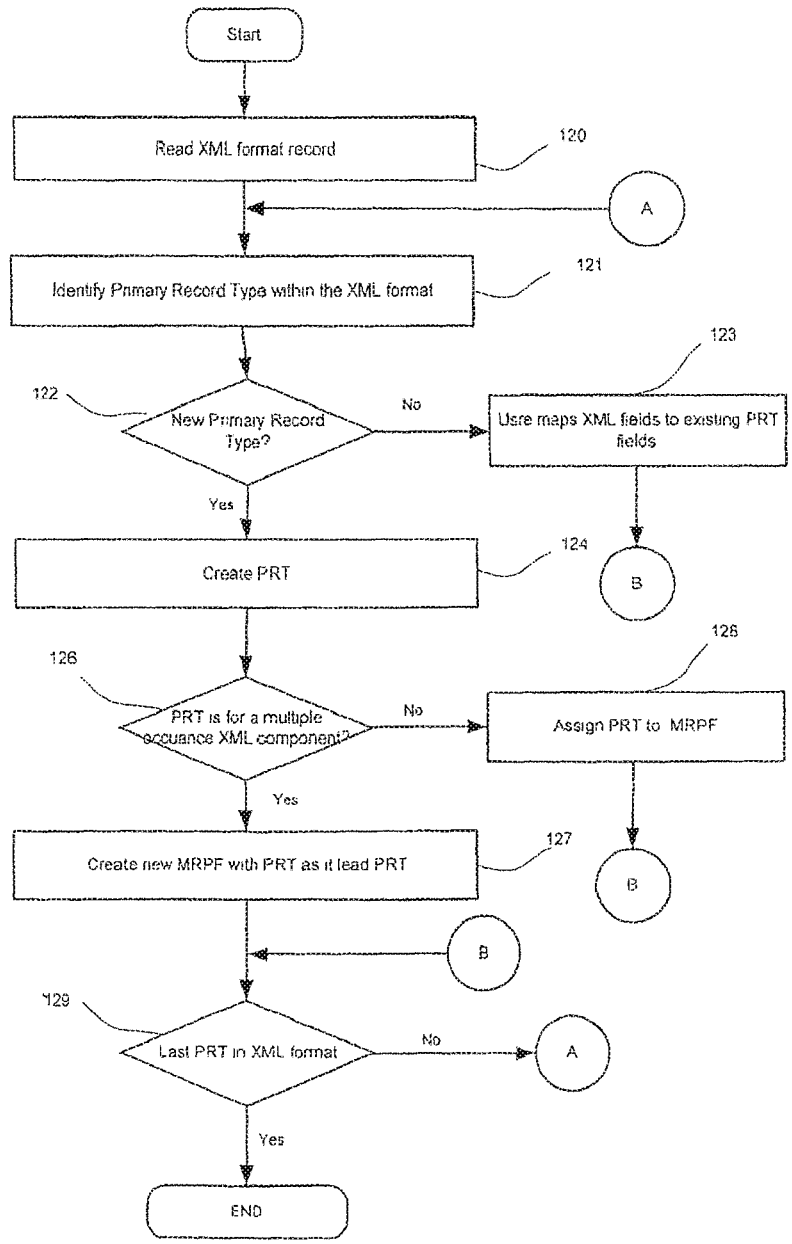
FIG. 5 is a flowchart of the preferred method for generating management record pointer families.

In FIG. 5, the preferred method for generating MRTs and their corresponding Management Record Pointer Families (MRPFs) is described. The process begins in step 120 where the user imports or enters an XML format. In step 121 where the invention identifies all the PRTs that comprise the XML document format. For every component within the XML document format that contains one or more components, the invention identifies a potential PRT. In step 122, the user indicates if the PRT already exists. If it does exist, in step 124 the user maps the field level components in the XML document to the fields in an existing PRT. The method then proceeds to step 129. If it does not exist the method automatically creates a new PRT. Step 126 checks the PRTs to determine if it is a multiple occurrence component: a multiple occurrence component can have more than one instance in a single XML document. If it is a multiple occurrence PRT, step 127 it creates a new MRPF with that PRT as its lead PRT (item 50 in FIG. 3). If it is a single occurrence PRT, step 128, the invention assigns the PRT to the MRPF where its parent PRT is the lead PRT. In step 129, the method determines if the XML format has any remaining PRTs to process. If any remain the method proceeds to step 121 to process the next PRT.

Figure 6:
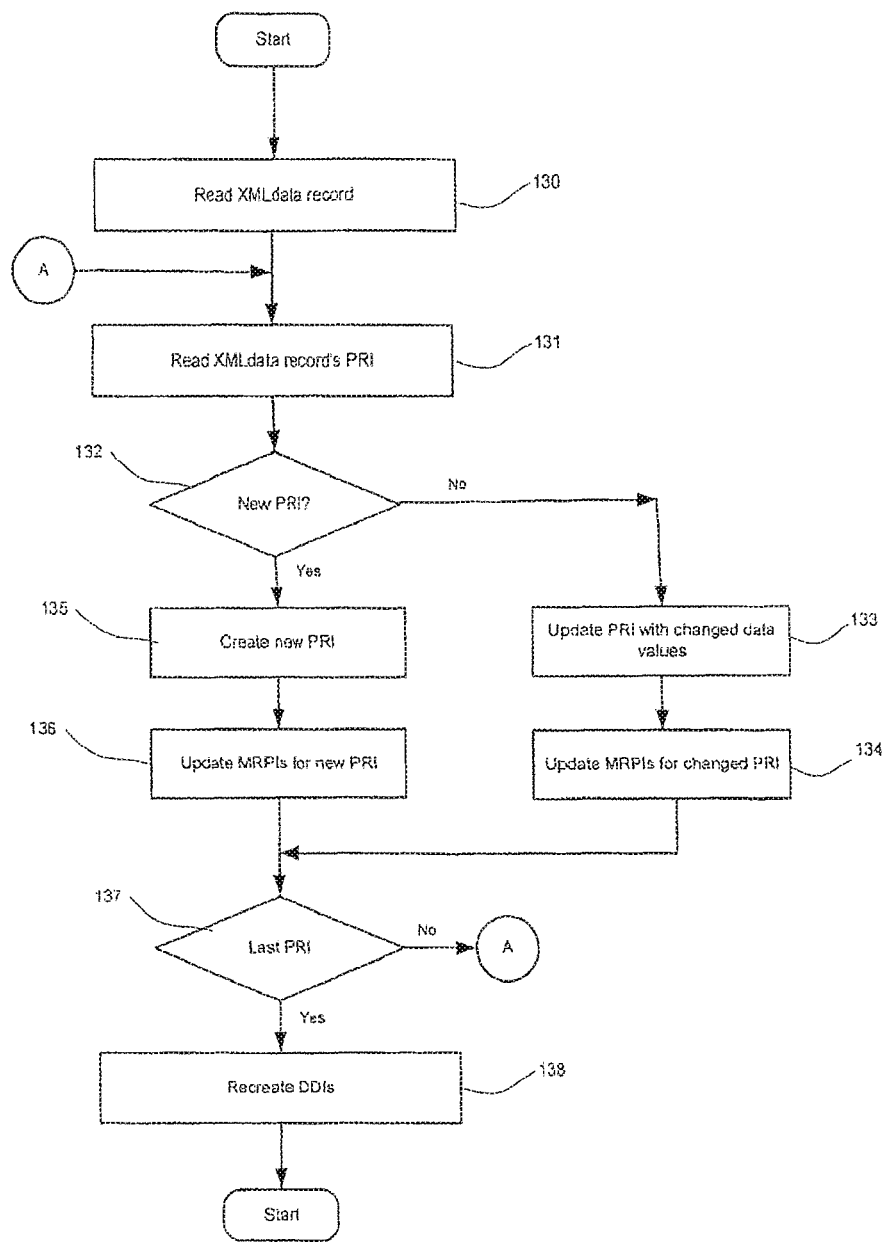
FIG. 6 is a flowchart of the preferred method for fetching data from an underlying data source and constructing management records.

In FIG. 6, the preferred method for copying the data in XML documents into the invention's DDs, MRTs, and PRTs. This process begins when the method receives a new XML document the user queried or some other program sent to the invention. In step 130, the XML document is read. In step 131 the components within the XML document that comprise one of its PRIs are read. Step 132 determines if the read components are for a new or existing PRI. If the PRI already exists, step 133, updates the existing PRI to reflect the new data values and step 134 updates the MRPF instance records (MRPIs) that use the changed PRI as described in FIG. 11. If the XML document includes a new PRI, step 135 creates it and step 136 updates the MRPIs that use the new PRI as described in FIG. 10. Step 137 determines if any additional PRIs exist within the XML document. If any remain, the invention returns to step 131 to process the next PRI. When all the PRIs are processed, step 138 recreates the DDs as described in FIG. 11.

Figure 7A:
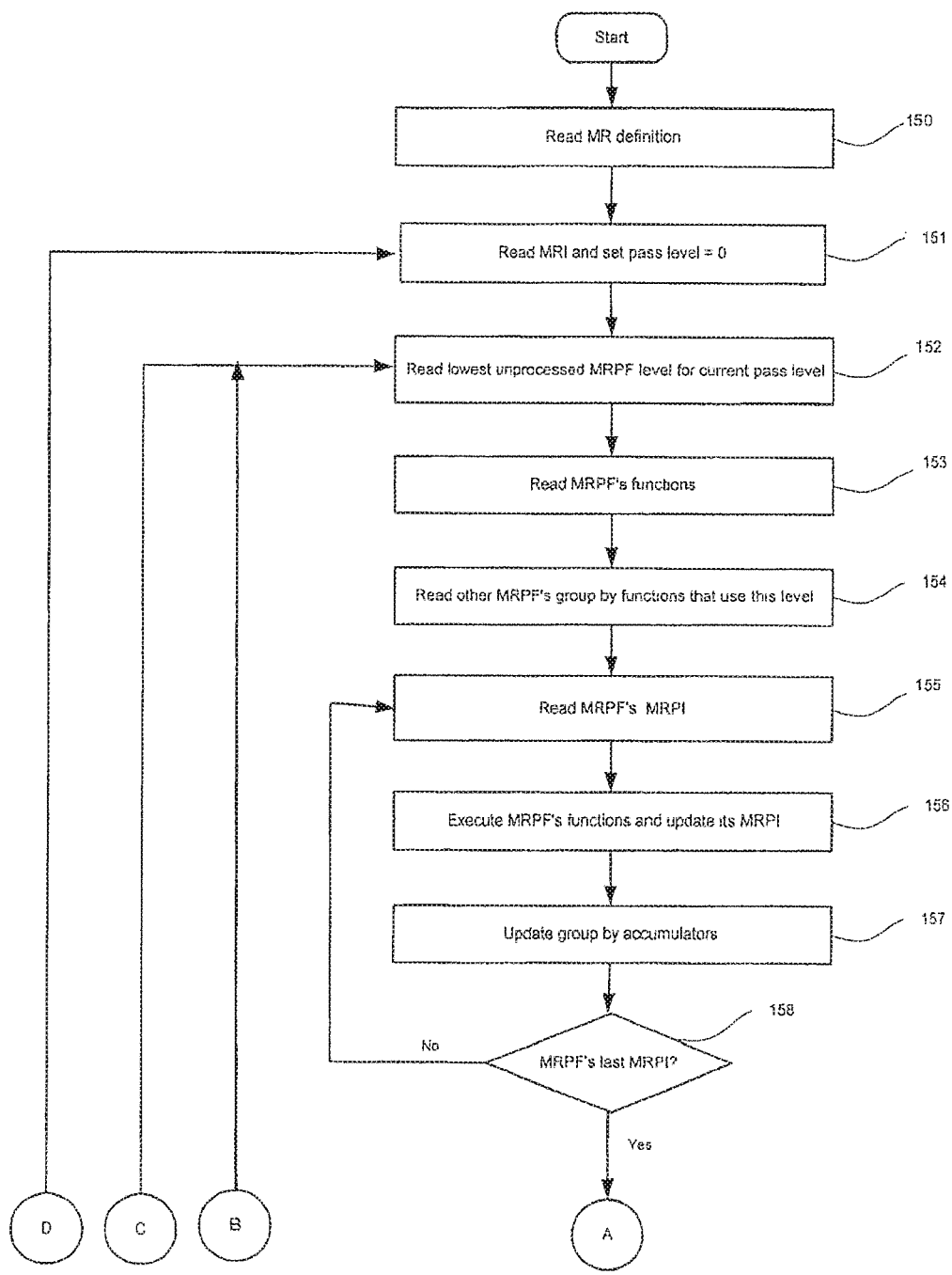
FIGS. 7A and 7B are a flowchart of the preferred method for executing functions for a new set of management records.
Figure 7B:
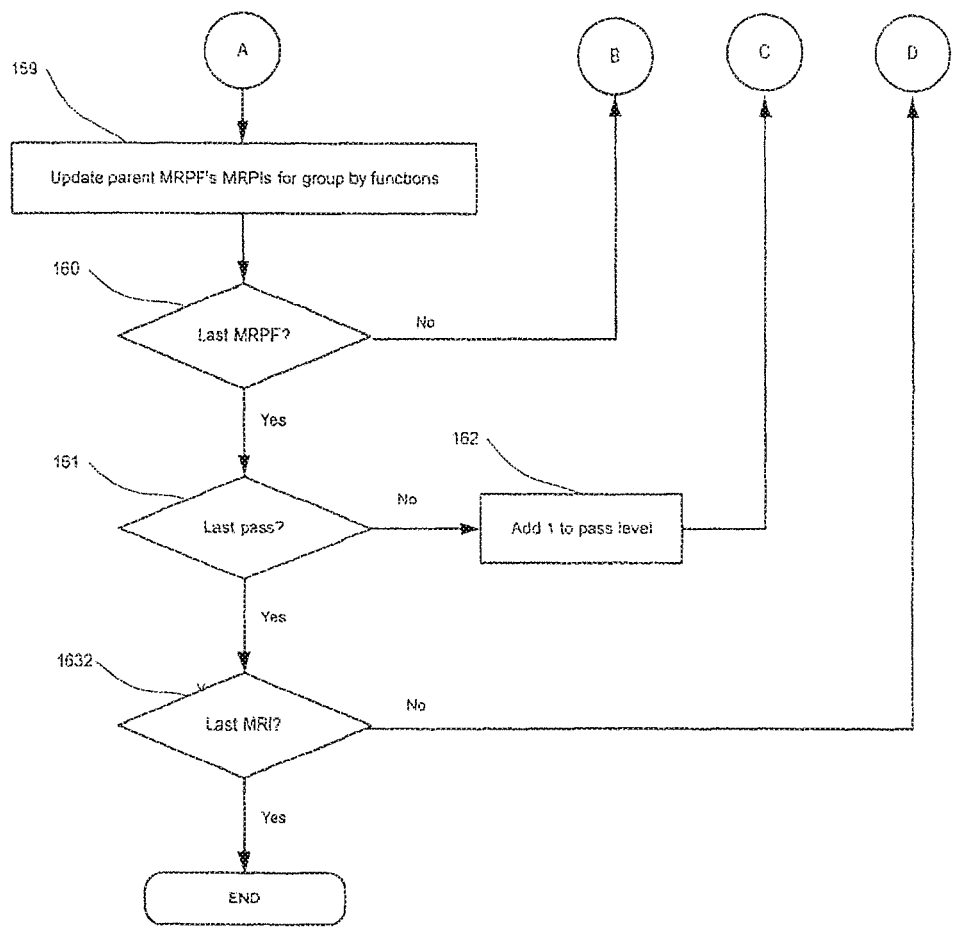

Referring now to FIGS. 7A and 7B, the preferred method for executing functions will be described. A function is one or more mathematical, financial, and statistical calculations performed using the fields of the MRT's PRTs. Examples of functions include: add, subtract, multiply, divide, round, test, join, summarize, generate a random number, log, remainder, and calculate present value. Examples of "group by functions" include: any occurrence, first occurrence, last occurrence, sum, average, count, maximum, minimum, standard deviation, variance, and net present value. The present invention is particularly advantageous because any combination of PRT fields and any MRPF calculated fields can be used in a function. If the field being used is not in the pointer family or one of the fore parents of the pointer family to which the results are assigned, the present invention requests that the user enter the "group by function" it should perform on that field prior to using it in the calculation. For example, if a user wishes to calculate an order discount by multiplying the order line dollar amounts by the order header discount and then store the results in the order header, the user would specify the "sum" group by function for the order line dollar amounts because order lines are children not fore parents of the order header where the result is stored.

The user specifies if particular functions should be executed prior to or after the filters are executed. If the user wants, for example, to not display tax order lines but wants to include the tax amount from those lines in the total order amount, the function to calculate total order amount from the order lines occurs prior to filtering out the tax order lines. If the user wants, for example, to not display tax order lines and does want to include the tax amount from those lines in the total order amount, the function is executed after filtering out the tax order lines.

The present invention attempts to minimize the time it takes to run the functions for a new set of management record instances (Mills) by running each function only once and by reading each PRI as few times as necessary. Because functions can include the results (calculated fields) of other functions, the present invention "restates" functions to improve calculation speed. The present invention first ensures that all functions are restated as only PRT fields and group by functions of PRT fields. Restatement eliminates (except for group by functions) one function being dependent upon another function because that function uses the result of the other function. Restatement occurs for each function when the user first defines (enters or maintains) it or one of its component functions. Besides replacing calculated fields with the fields from which they are calculated, the present invention also determines in which pass a specific function should be processed. For a particular MRI, the present invention must make multiple passes when a group by field from one level in the MRPF hierarchy is used in a function in another level in the MRPF hierarchy and the result of that function is used in another function in the original group by function hierarchy level. For each function, the present invention checks to see if that function is comprised of any function which uses a group by fields from a different hierarchy or uses a calculated field from a hierarchy level higher than the current level. If either of the above two conditions exist, the present invention adds one to the calculation pass sequence number. The present invention then runs the same routine on the subfunctions that meet the test conditions. The present invention continues this process until it has no more sub-functions to test. As a result of this process, each function has a pass sequence number.

As shown in FIGS. 7A and 7B, the method starts with step 150 in which the MRT definitions are read. The present invention processes each MRI separately. Then, in step 151, a MRI is read and the pass sequence number is set equal to zero. In step 152, the method reads the lowest unprocessed MRPF level for this pass. First, the method executes for each MRPI all the functions with a pass sequence number of zero at the same time. It starts with the MRPFs that are lowest in the hierarchy and works its way up. In step 153, the method reads the MRPF's functions. Then in step 154, the method reads other MRPF's group by functions that use this level. Group by functions are executed with the MRPF they summarize, not the MRPF where the result is stored. The MRPIs of the MRPF are then read in step 155. Then in step 156, the functions for this MRPF are executed and added to the MRPI. The group by accumulators is then updated. Group by accumulators store not only the results of the group by calculation, but also enough information to recalculate the amount without rereading all the MRPIs if one of the component MRPI changes. For example, a "mean" group by accumulator includes not only the means but also the total number of MRPIs. Next in step 158, the system determines whether the MRPI being used to execute the functions is the last MRPI for this MRPF. If not, the method returns to step 155, otherwise the process continues in step 159. In step 159, the group by results is added to the parent MRPI. Then in step 160, the method test whether this is the last MRPF for this MRT. If not, the process loops to step 152 to process any unprocessed MRPFs, otherwise the process continues in step 161. In step 161, the method determines if this is the last pass. The higher the pass sequence number that a group by function has the latter it gets processed. The sequence number is based on the nesting of the group by function. If it is not the last pass, then 1 is added to the pass sequence number in step 162 and the method returns to step 152 for further processing. After each pass of all the MRPIs, the method executes the functions with the next highest pass sequence number until all functions are executed. However, if it is the last pass, the method continues in step 163 where the process tests whether this is the last MM to perform functions for. If not, the process returns to step 151, otherwise the execution of the functions for the MRT is complete.

The present invention also provides for manipulation of the data using filters. The filters of the present invention are advantageous because the user does not need to join the underlying tables together in his/her select statement. Users can select a subset of all possible MRTs and a subset of the MRPFs that comprise the selected MRTs. Section criteria are applied against any PRT or calculated field in the MRT. Where there could be multiple occurrences of the field in a MRT (such as quantities ordered on one customer order), the user must also specify a group by filter just as with functions. The present invention has the two special group by filters "any" and "all." The other selection criteria are: equal to, not equal to, greater than, less than, like, and exists in dynamic document X. Filters can be comprised of multiple selection criteria. The criteria can be nested and include AND/OR conditions. An example of a filter is give me all MRTs where the customer is in California, and the total of the order line amounts is greater than $10,000, and any of the Salespersons are in territory one, or the order is on hold.

Any number of filters for a MRT or its MRPFs can be active at any time. The user defines as many filters as he/she wishes and then activates and deactivates them whenever he/she wants. Filters are executed either when the MRIs are fetched by the production data source or after they are stored in memory 18. The user specifies which filters should be part of the fetch. Because of performance concerns, fetches with group by functions cannot be used for fetches. The user can also indicate if the filter is for just temporarily hiding the data or for deleting the data. If a parent MRPI is filtered out, so are its children MRPIs. Filters for MRTs are handled exactly like filters on the top most MRPF in the hierarchy.

Figure 8A:
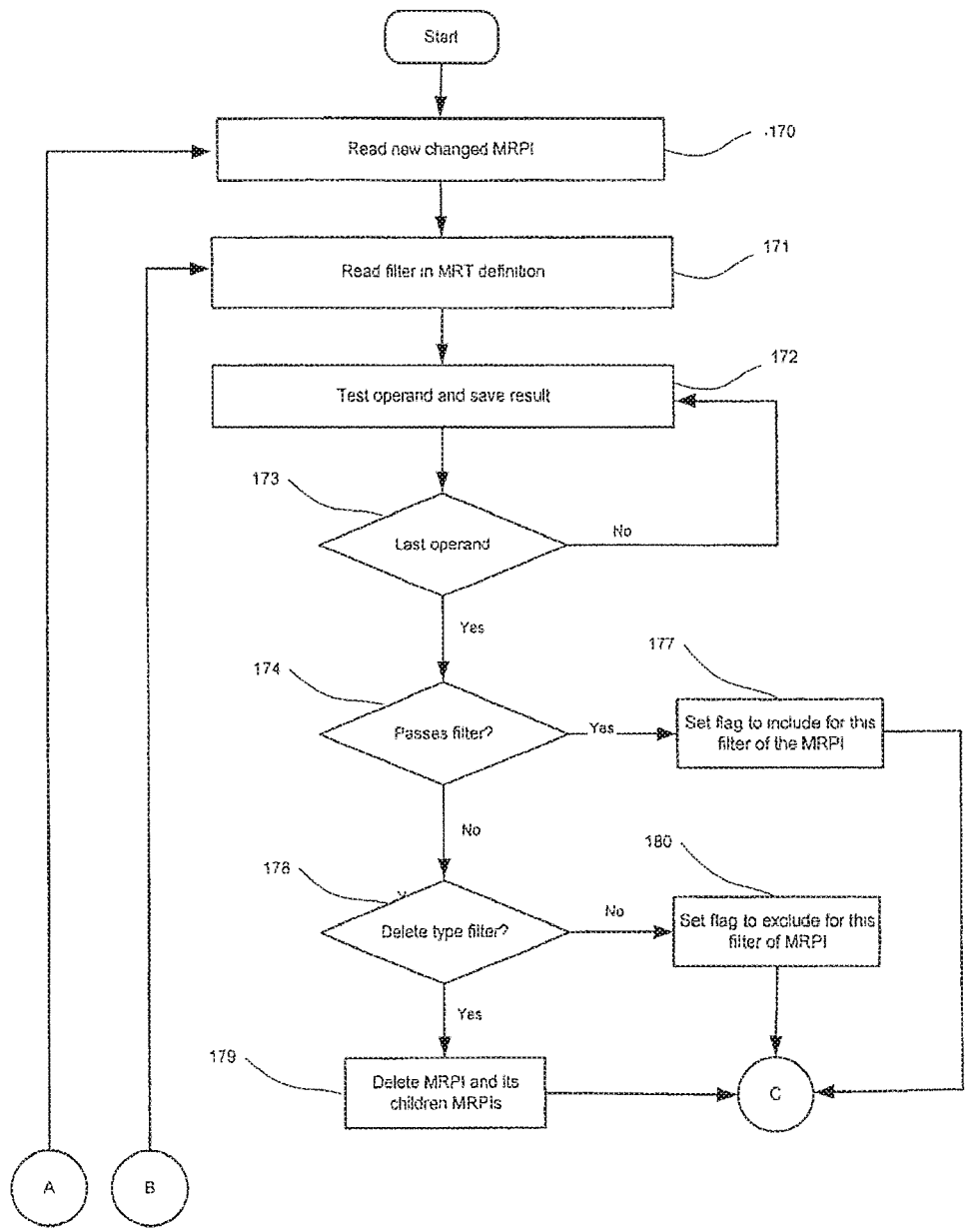
FIGS. 8A and 8B are a flowchart of the preferred method for executing a filter for any number of management records and their pointer families.
Figure 8B:
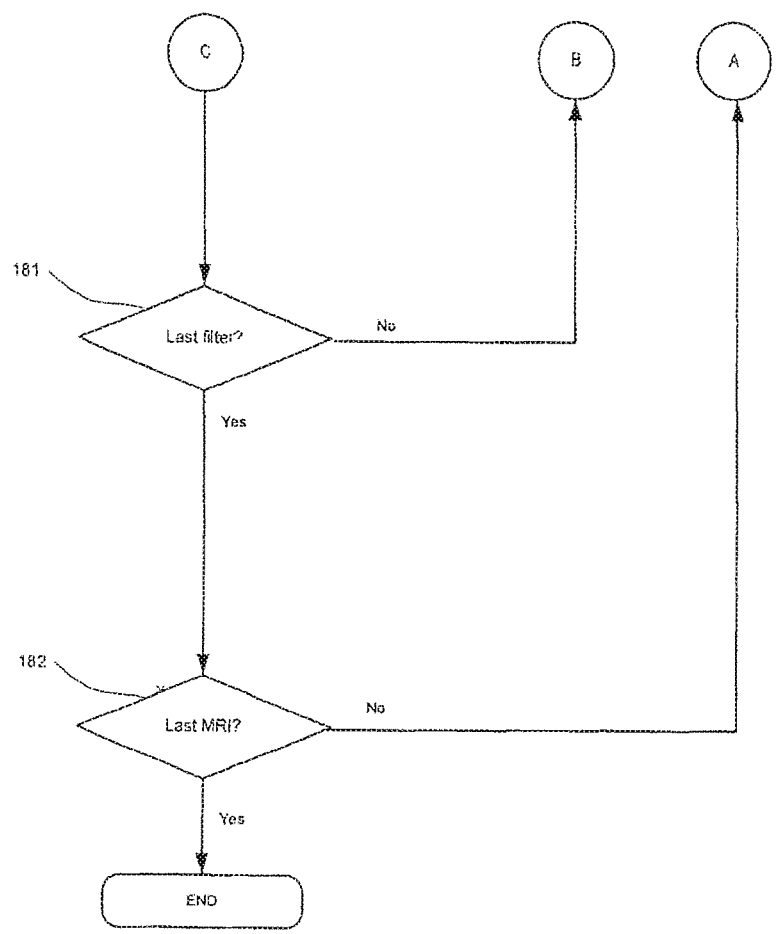

FIGS. 8A and 8B illustrate the preferred process for executing filters. The process begins by reading any new or changed MRPI in step 170. Then a filter from the MRT definition is read in step 171. Next, in step 172, an operand is tested, and the result is saved. Since all filters operate on fields in the MRPF or on fields which have been grouped by a function into the MRPF, each MRPI can be fully tested to see if it should be filtered out by reading only the MRPI's calculated fields and its PRT's PRI field values. For improved processing efficiency, the present invention executes all of a MRPI's filter tests one after the other. The operation tests are simple Boolean tests to see if the field's value equals the value stored in the filter, or stored in the specified variable, or is in the list (Dynamic Document) specified. The present invention stores the result (true or false) of each operation. The method then determines if this operand is the last operand to test in step 173. If not, the process returns to step 172 to test the next operand. If all the operands have been tested, then the process continues to step 174. In the step 174, the method looks at the results of each operand to determine if the entire filter results in a pass or fail. If the MRPI passed the filter, the method proceeds to step 177 where the method appends to the MRPI a flag for each filter indicating if the filter includes that particular MRPI. If the MRPI fails the filter, the method jumps to step 178 to evaluate the filter type. In step 178, further tests are performed to determine if the filter is a delete type. If the filter a delete type (i.e., MRPIs that are filtered out are deleted instead of not being displayed), the MRPI and its children MRPIs are immediately deleted in step 179 so no other filter need process them. Any MRPI that has any parent MRPI that is excluded is itself excluded. If the filter is not a delete type, then the flag is set to exclude in step 180 for this filter in the current MRPI's MRPF filter affects list. Any MRPI that is excluded by any active filter is not displayed in the currently open DDs 20. Next, step 181 determines whether there are additional filters to be processed. If so the method loops to 171, otherwise the method tests whether this is the last MRPI to be processed in step 182. If there are more MRPIs to process, the method returns to step 170, otherwise, the process is complete.

As has been noted above, Dynamic Documents are used to display XML document data to the user. Essentially, DDs are a rearranged and reformatted MRT. A DD is a window on the display device 14 comprised of a hierarchy of display panes. Each pane displays one or more of the MRT's PRTs and calculated fields. The user can define functions, sorts, and filters for each DD. A DD is also a tool for users to update a PRI and thereby the MRs and DDs that reference the PRT. Each DD corresponds to one MRT and each DD pane corresponds to one or more of the PRTs used by its MRT. The advantage of using DDs to create multiple data view and update transactions is that the data relationships can be radically restructured from that of the MRT. Child records can become parents, records can share fields, calculated fields can be created, and sets of records can be summarized into single records and values.

The DDs are created by the user based on the types of information that the user wants to view and update. The user selects which of the PRTs in the MRT to include in the dynamic document pointer (DDP). For user viewing or update, the invention creates DDP records by accessing the field values in its underlying PRT's PRIs and its underlying MRPI's calculated fields. Any PRT in the MRT can be used in the DDP and can be used more than once in a single DD. While their shared hook predefines the relationship between any two PRTs in a MRT, the user defines the relationship between any two PRTs in a DD. By putting a PRT in a parent hierarchy pane, the user is making that PRT the parent of all the PRTs in the children panes even if the PRTs have a different relationship in the MRT. This capability allows the user to represent the data in virtually anyway they want even though that representation is not supported by the production data source in which the data is stored. For example, a customer order MRT that has its Items PRT hooked to its Order Lines PRT which in turn is hooked to its Order Header PRT and also has Salespersons separately hooked to its Order Header PRT, as described above with reference to FIG. 3, can have a DD where the Item PRT is in the top level pane and the Salesperson is in a child pane. In this example, the Item has become the parent of Salesperson. The DD displays in the top pane any Item used in any Customer Order MRT, and displays in the child pane all the Salespersons that sold that Item on any Customer Order.

When the user places a PRT in a DDP, the user gains access not only to the PRT's fields in that pane and any of its child panes, but also access to all the calculated field of the PRT is MRPF. These calculated fields are comprised of fields of the selected PRT and also any field from any other PRT in the MRT. In the above example of the Items pane, the user could display the total amount ordered on all orders for each item even though the DD does not include the order lines or order header PRTs which are required for this calculation. The user creates the DD Pane definition by entering the pane's name, its position in the pane hierarchy and then by selecting as many of the PRTs of the MRT that are to appear in the pane. The system then automatically joins the PRT's MRPIs together to create the DDPs. These DDPs are the DD equivalent of MRTts MRPIs. Each DDP corresponds to a single pane display row and can roll up into display subtotal rows.

The user specifies how to update production data sources (other than the PRTs) by defining as many separated transactions types as desired. Then the system, for any single update to the DD, automatically creates Production Data source Update Transactions Instances (UTs) and posts them to the appropriate data source. Each Production Data Source Update Transaction Type (PDUTT) can update as many PRTs as the user wishes; the only restriction is that they all be in the same instance of a production data source. A DD's PDUTTs are similar to its pane attributes and report attributes in that it formats the field into an output medium. One primary difference is that a PDUTT does not always request the current value; it can also get the amount a value has changed by as a result of a transaction, or a literal amount stored in the PDUTT. Also, a PDUTT is different in that its instances (UTs) are only created when the DDs underlying MRIs are changed. The user can have all MRI changes result in UTs or can limit them to only changes entered through the DD of the PDUTT, or only when the DD is active (i.e. opened by the user).

Figure 9A:
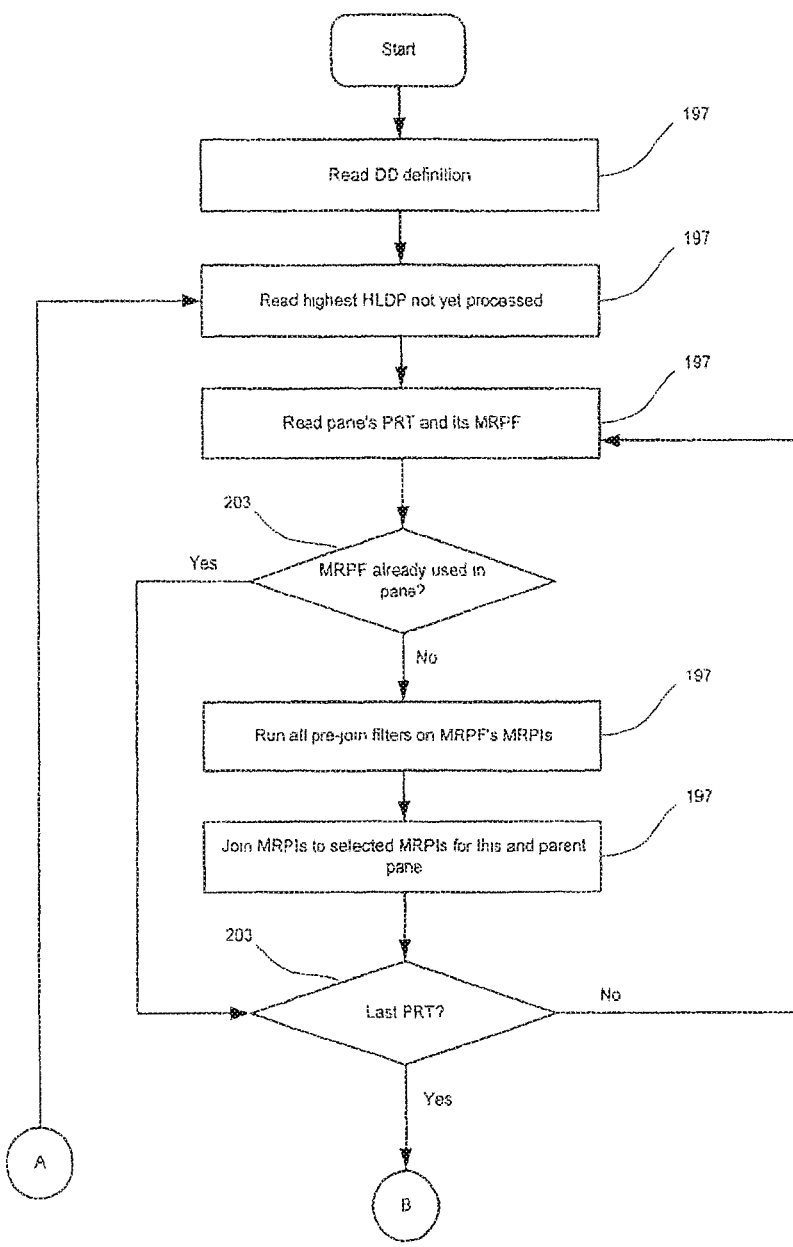
FIGS. 9A and 9B are a flowchart of the preferred method for creating a dynamic document pointer for a new set of dynamic documents.
Figure 9B:
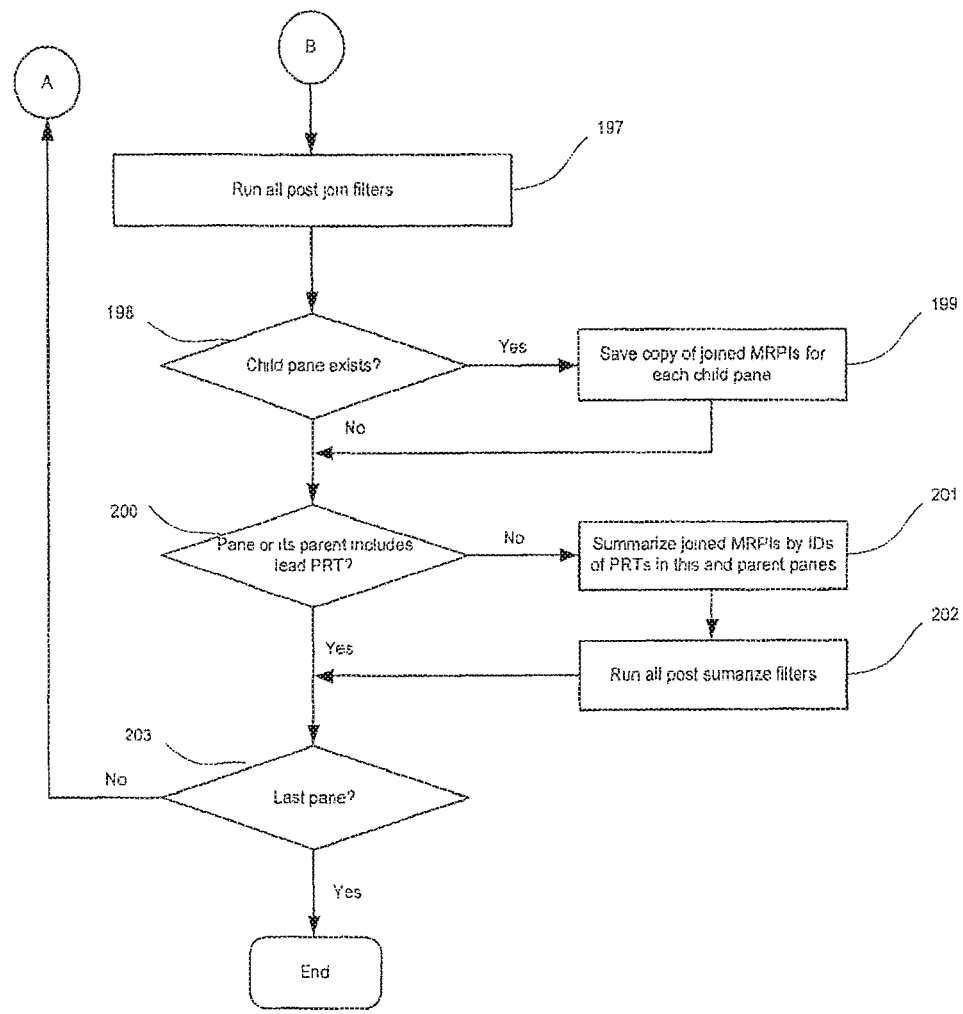

Referring now to FIGS. 9A and 9B, the preferred method for creating DDPs is described. First, the DD 20 is read in step 190. Then the highest hierarchy level pane definition not yet processed is read in step 191. In step 192, the pane's PRT and MRPF are read. Next, the method tests whether the MRPF is, already used in an existing pane in step 193. If so, the method jumps to step 196 and avoids having to initialize the pane. On the other hand, if the pane does not exist, it must be created. The method creates the pane in steps 194 and 195. In step 194, the method runs the pre-join filters on the MRPF's MRPIs. In step 195, the method joins the MRPIs to previously selected MRPI's for this pane, and the one from the parent pane. The panes are preferably joined on MRT identification and parent MRPF ID fields. The method then continues in step 196. In step 196, the method determines if this is the last PRT to be processed. If not, the process returns to step 192 and reads other PRTs. Otherwise, the method continues in step 197. In step 197, the method runs all post join filters. Then in step 198, the method tests whether any child panes for this PRT exist. If there are child panes, the method saves a copy of the joined MRPI for each child pane and continues directly to step 200. If there are no child panes the method proceeds directly to step 200. In step 200, the method determines if this pane or its parent panes include lead PRT for all its MRPFs. If lead PRTs are included, the method executes steps 201 and 202. In step 201, the system summarized the joined MRPI's by identification of the PRTs in this and the parent panes. If all the panes include lead PRTs for each MRPF, the summarization step 201 would have no effect; that is why it is shipped. The system in step 202 then runs all post summarize filters, and moves to step 203. If lead pointers are not included, the method moves directly to step 203 and determines whether this is the last pane to modify. If not, the method loops to step 191, otherwise the process ends.

Figure 10:
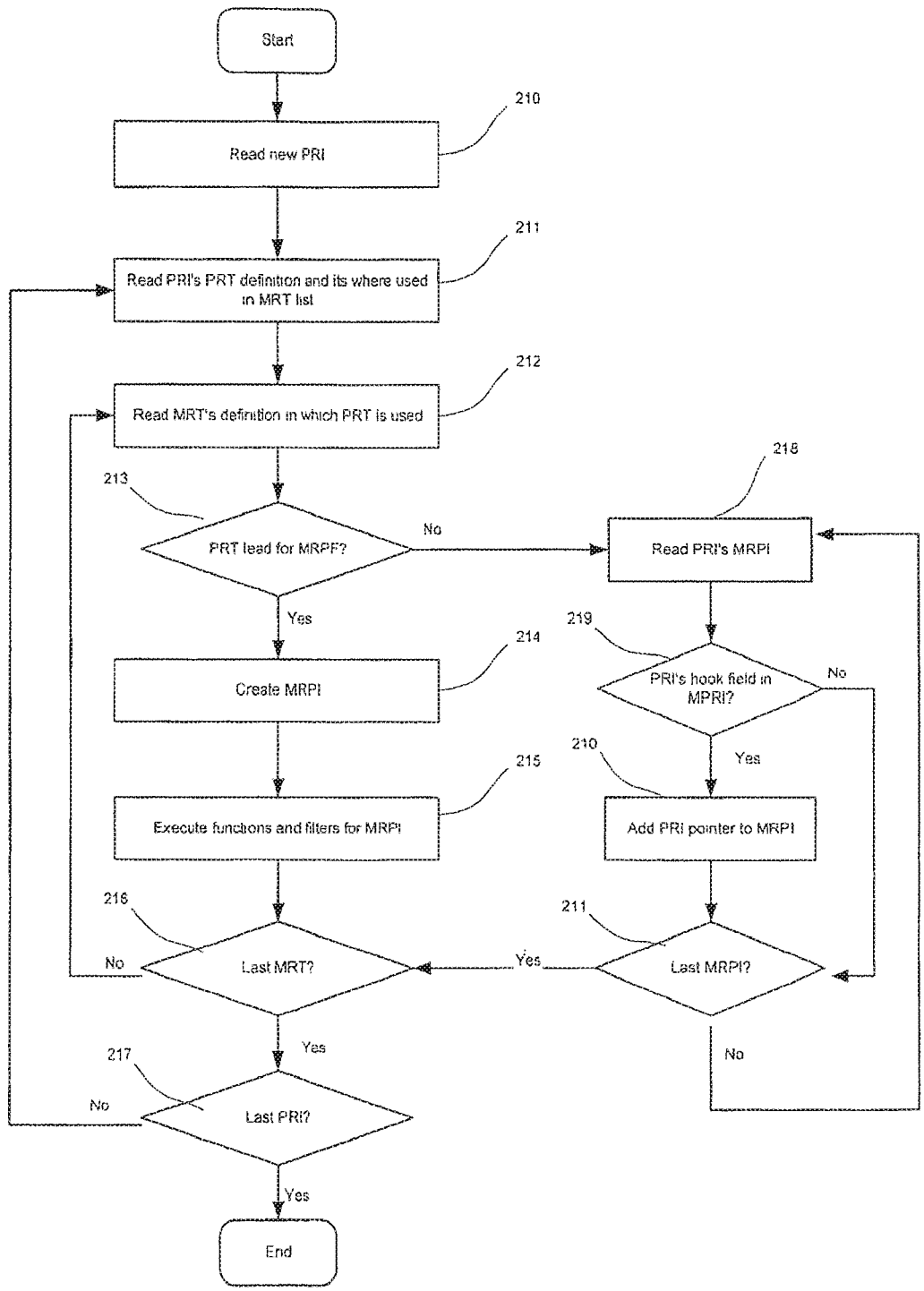
FIG. 10 is a flowchart of the preferred method for updating a management record for a new primary record instance.

FIG. 10 illustrates the preferred method for updating a MRT for a new PRI. The method starts by reading the new PRI in step 210. Then in step 211, the PRT definition and the where used list of this PRI are read. Next in step 212, the definition of the MRT listed in the where used list of step 211 is read. Next, the method determines if the PRT is a lead PRT of a MRPF in step 213. If it is a lead PRT, the method continues in step 214 where a MRPI is created. Then in step 215, the function and filters for the MRPI are executed. If it determined not to be a lead PRT in step 213, then the MRPI of the MRPF is read in step 218. Then in step 219, the method tests if the PRI's hook field is in an MRPI. It will rarely be true because this means the PRI was then referenced before it was created. If so, the PRI pointer is added to the MRPI in step 220 and then method proceeds to step 221. If the PRI's hook field is not a MRPI, the method proceeds directly to step 221 where the method determine if this is the last MRPI to process. If there are additional MRPIs, the method returns to step 218 otherwise the method continues to step 216. In step 216, the method tests whether there are additional MRTs to process. If there are, the method jumps to step 212. If not, the method test for additional PRI to process in step 21. For any more PRI, the method returns to step 211, or else the process is completed.

Figure 11A:
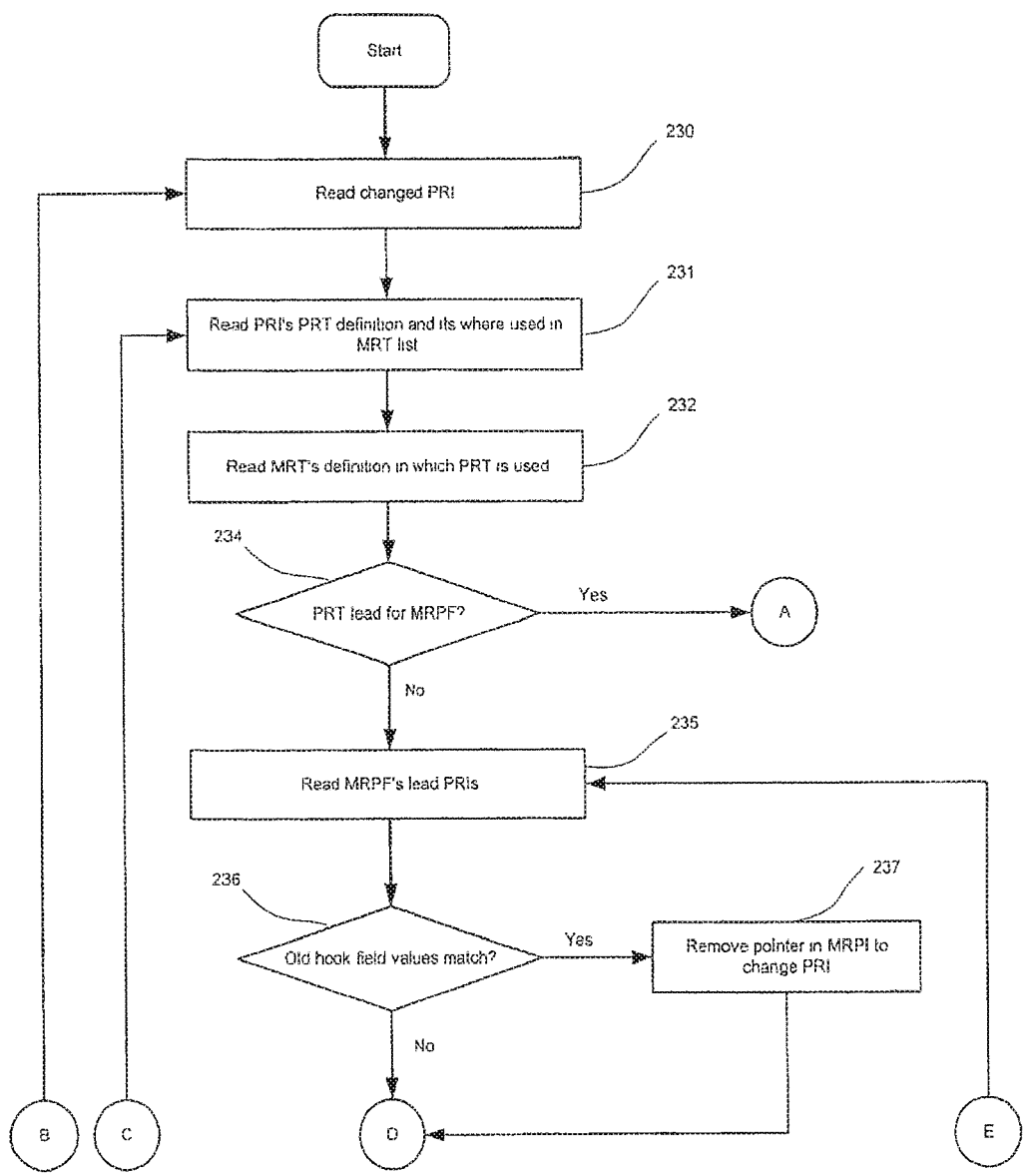
FIGS. 11A, 11B, and 11C are flowcharts of the preferred method for updating a management record pointer instance for a changed primary record instance.
Figure 11B:
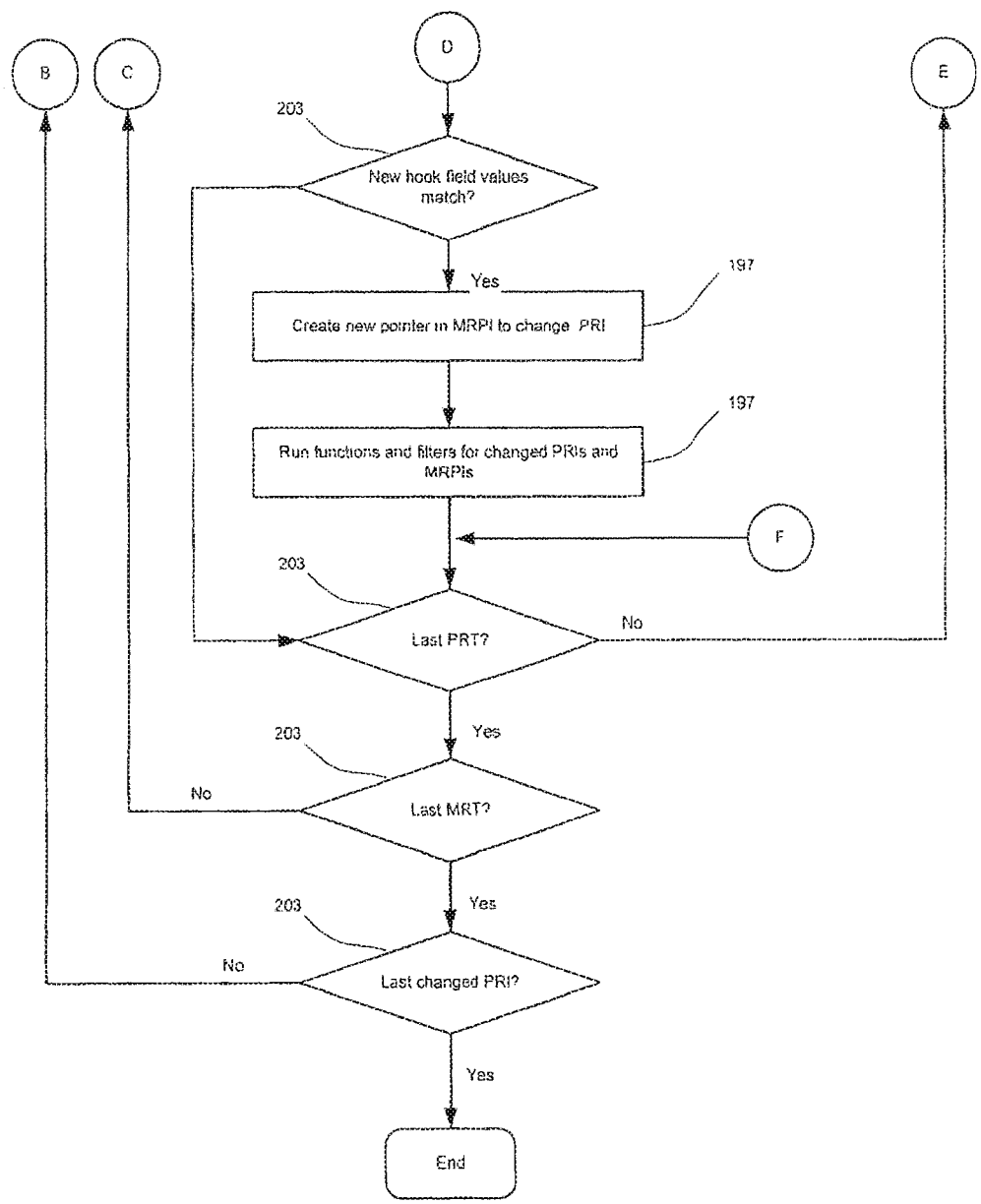
Figure 11C:
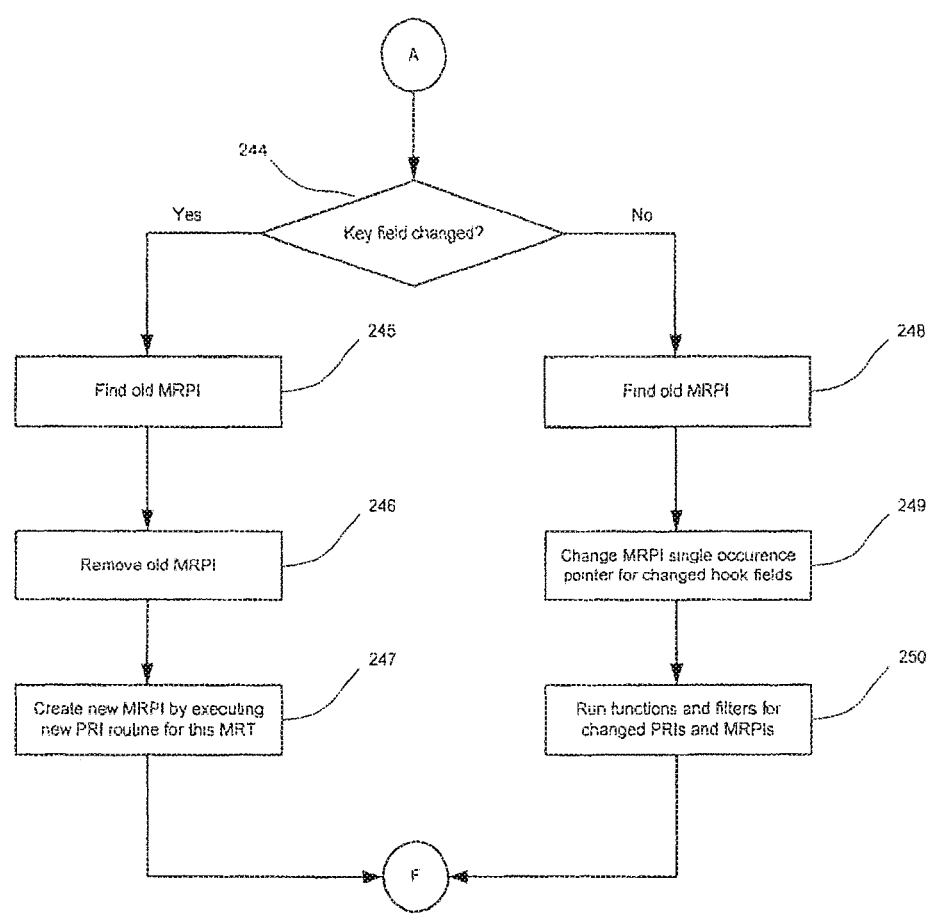

Referring now to FIGS. 11A, 11B, and 11C, the preferred method for updating a MRT for a changed PRI is described. Similar to the method of FIG. 10, the process begins by reading the changed PRI in step 230, reading the PRT definition and the where used list of this PRI in step 231, and reading the definition of the MRT listed in where used list in step 232. The method next tests whether this a lead PRT for a MRPF in step 234. If the PRT is a lead PRT for a MRPF, the method continues with step 244 of FIG. 11C. In step 244, the process determines if a key field was changed. If a key field was changed, the method executes step 245, 246 and 247, to respectively find the old MRPI, remove the old MRPI, and create a new MRPI by executing the new PRI routine of FIG. 17A for this MRT. However, if a key field was not changed, the method finds the old MRPI in step 248, changes the MRPI single occurrence pointer for the changed hook fields in step 249, and then runs the functions and filter for the changed PRIs and MRPIs. After competition of either branch, the method returns to step 241 of FIG. 11B.

Referring back to 11A, if the PRT is not a lead PRT for a MRPF, the method continues in step 235 by reading the lead PRIs for the MRPF. Then in step 236, the method compares the old hook fields values to determine if they match. If there is a match, the PRI is changed by removing the pointer in the MRPI in step 237 before proceeding to step 238. In step 238, the method tests if the new hook values match. If there is no match the method jumps to step 241. If there is a match, the PRI is changed by creating new pointer in the MRPI in step 239. Then the method runs the functions and filters for the changed PRIs and MRPIs in step 240. Then the method test whether the current process involves the last PRT, the last MRT or the last changed PRI in steps 241, 242, and 243, respectively. If this is not the last PRT of the last MRT for the last changed PRI, then the method loops to the appropriate step (i.e., steps 235, 231 and 230) for further processing.

Figure 12A:
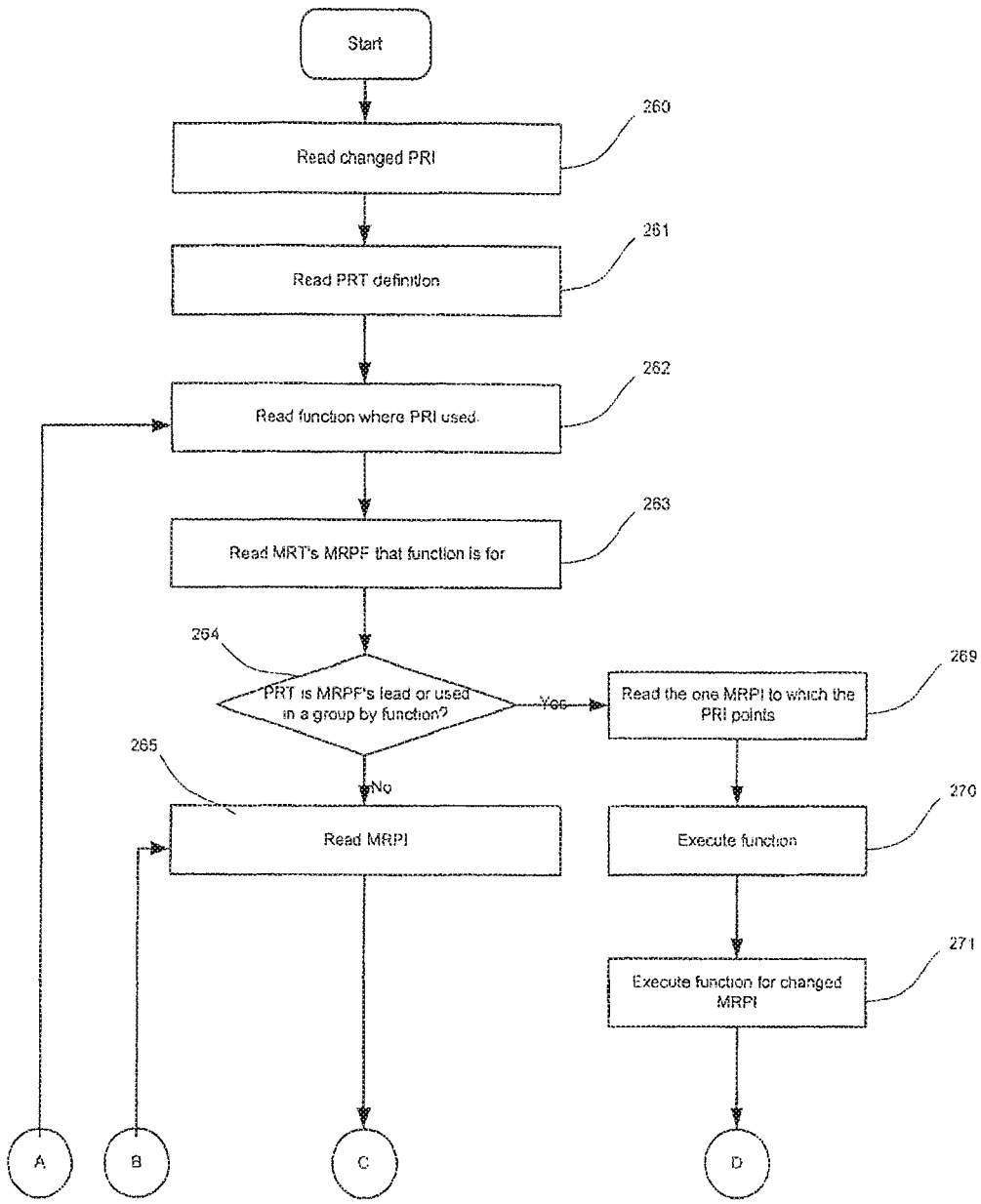
FIGS. 12A and 12B are a flowchart of the preferred method for executing a function for a changed primary record instance.
Figure 12B:
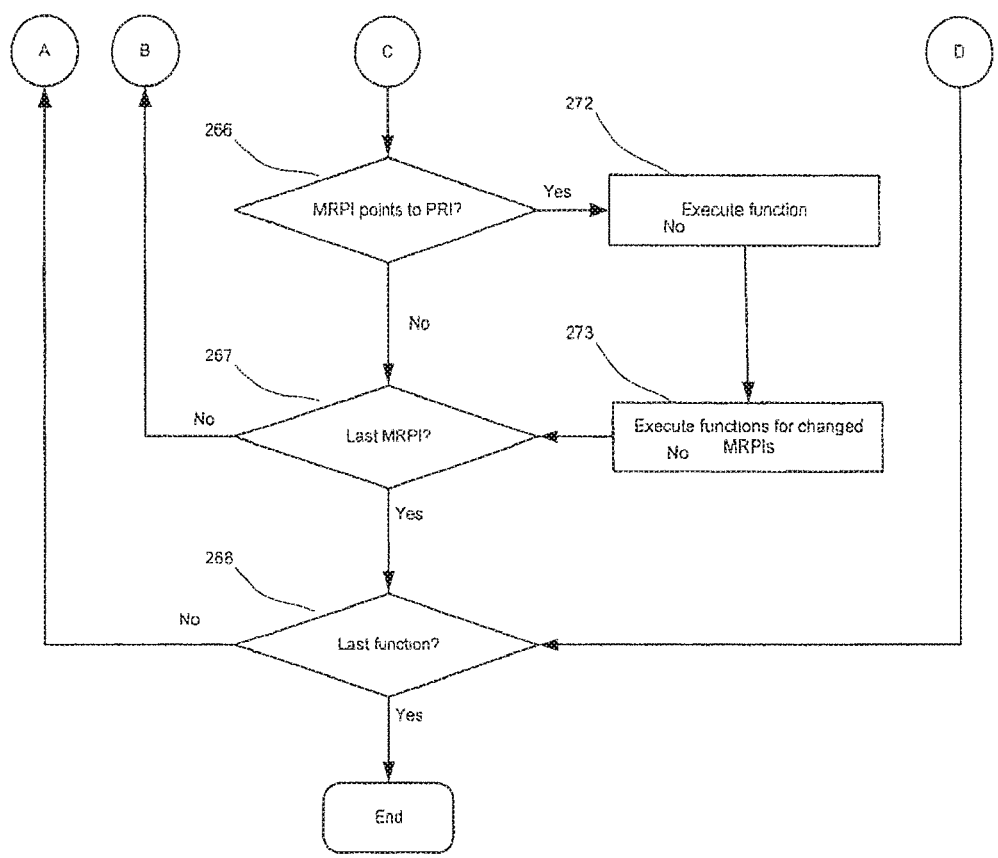

The preferred method for executing a function for a changed PRI is shown in FIGS. 12A and 12B. The present invention handles PRT fields that are used in a group by function or used in the function of a child MRPF especially for recalculation purposes. Whenever one of these PRT's fields change, present invention not only recalculates the functions for its own MRPIs but also recalculates the group by function value and the other functions in which it is used. In other words, present invention treats these fields as calculated fields by finding where they are used and making sure that the additional appropriate recalculations take place. The present invention does this by keeping pointers to the group by functions and functions of the other MRPFs that use the field.

The preferred method begins by reading the PRI and the PRT definition in steps 260 and 261, respectively. Then in step 262, the function using the PRI is read. Next in step 263, the MRT's MRPF for the function is read. Whenever a PRT's PRI changes, the present invention finds the MRPFs that use that PRT and tests whether any of its functions use the changed fields. In step 264, the method determines if the PRT is a lead PRT of the MRPF or used in a group by function. If so, the method continues in step 269 by reading the MRPI to which the PRI points. In each MRPI, the present invention stores the MRPI for each MRPF parent. Each parent MRPI that has group by functions using any of the changed fields has its group by value recalculated. Recalculation does not require reprocessing of all the records that are included in the group. The present invention stores enough information about—each group by field to recalculate the correct balance for the before and after image of the changed field. For example, for the average field, present invention also stores the number of values used as well as the actual average. New avenges are calculated by multiplying the number of values times the average then subtracting the old value and adding the new value and then dividing by the stored number of values. Then the function is executed in step 270. There functions are executed in a conventional manner. The process is similar to that used in spreadsheets and third generation languages. In step 271, the functions for any changed MRPI are executed, after which the method jumps to step 268. However, if the PRT is not a lead PRT of a MRPF or in a group by function, the method proceeds to step 265 where the MRPI is read. Next, in step 266, the method tests whether the MRPI points to a PRI. Next, the present invention checks to see it any of the calculated fields that the present invention just updated are used in other group by functions. If so, it recalculates the group by value in the appropriate parent MRPF's MRPI. The present invention continues this loop of cascading group by executions until the set of calculated fields that are recalculated have no impact on any other function because those group by fields are not used in any other function. If it does point to a PRI, the function is executed in step 272, and the functions for any changed MRPI are executed in step 273. The method then continues in step 267 or arrived at step 267 directly from step 266. In step 267, the method tests whether there are any other MRPI for the changed PRI. If there are additional MRPIs, the method returns to step 265 to read another MRPI and process it as has been described above. If there are no more MRPIs, the method moves to step 268 and tests whether this is the last function for the modified PRI. If not, the method returns to step 262 to retrieve and process the next function. Once all the functions have been processed the present method is complete.

Generally functions are executed whenever the user accepts some changes made to a pane row. The user has the option of deferring the execution of the affected functions until he/she wishes. Deferring changes can speed up entry of changes. The present invention knows which other functions to run because whenever a function is defined or maintained, the present invention adds a pointer to the Where Used Pointers of the PRT Fields Definition and the Where Used Pointers of the Function Definition.

Figure 13:
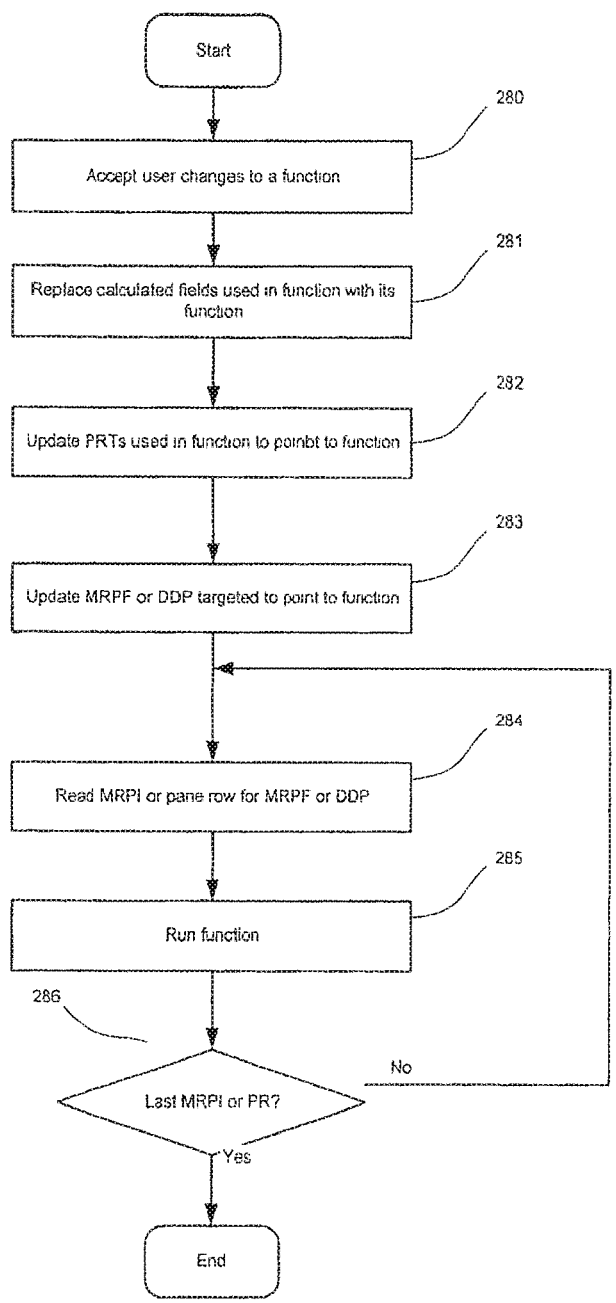
FIG. 13 is a flowchart of the preferred method for maintaining a function for a changed management record type or dynamic document.

FIG. 13 illustrates the preferred method for maintaining a function and its corresponding calculated fields in MRPIs and DDPs. The process begins by accepting user changes to the function in step 280. Then the method replaces the calculated fields used in the function with its function. Next, in step 282 the method updates the PRTs used in the function to point to the function. Then in step 283, the MRPF or the DDP targeted to point to the function are updated. In step 284 the MRPI, pane row for the MRPI, or the DDP is read. Finally, the function is run in step 285. Then the method tests for other MRPI or PRTs affected by the function change and returns to step 284 to process them. Once all the MRPIs and PRT have been processed, this method ends.

Figure 14:
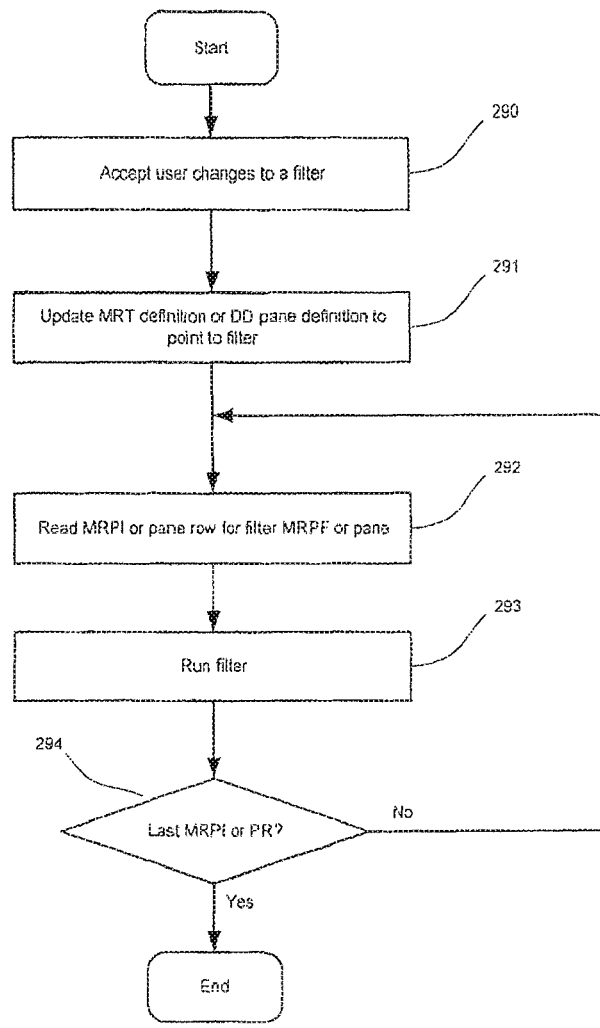
FIG. 14 is a flowchart of the preferred method for maintaining a filter definition for changed management record type or dynamic document.

FIG. 14 illustrates the preferred method for executing a filter if the filter has been modified. The method starts by accepting the user's changes to the filter in step 290. Then in step 291, the method updates the MRT definition or DD 20 pane definition to point to the filter. Next, the method reads a MRPF, a pane row, or a MRPI for filters pane in step 292. The filter is then executed with the changes in step 293. The method then test whether there are other MRPI or PRT affected by the filter changes and then returns to step 292 to process them if they are present.

Figure 15A:
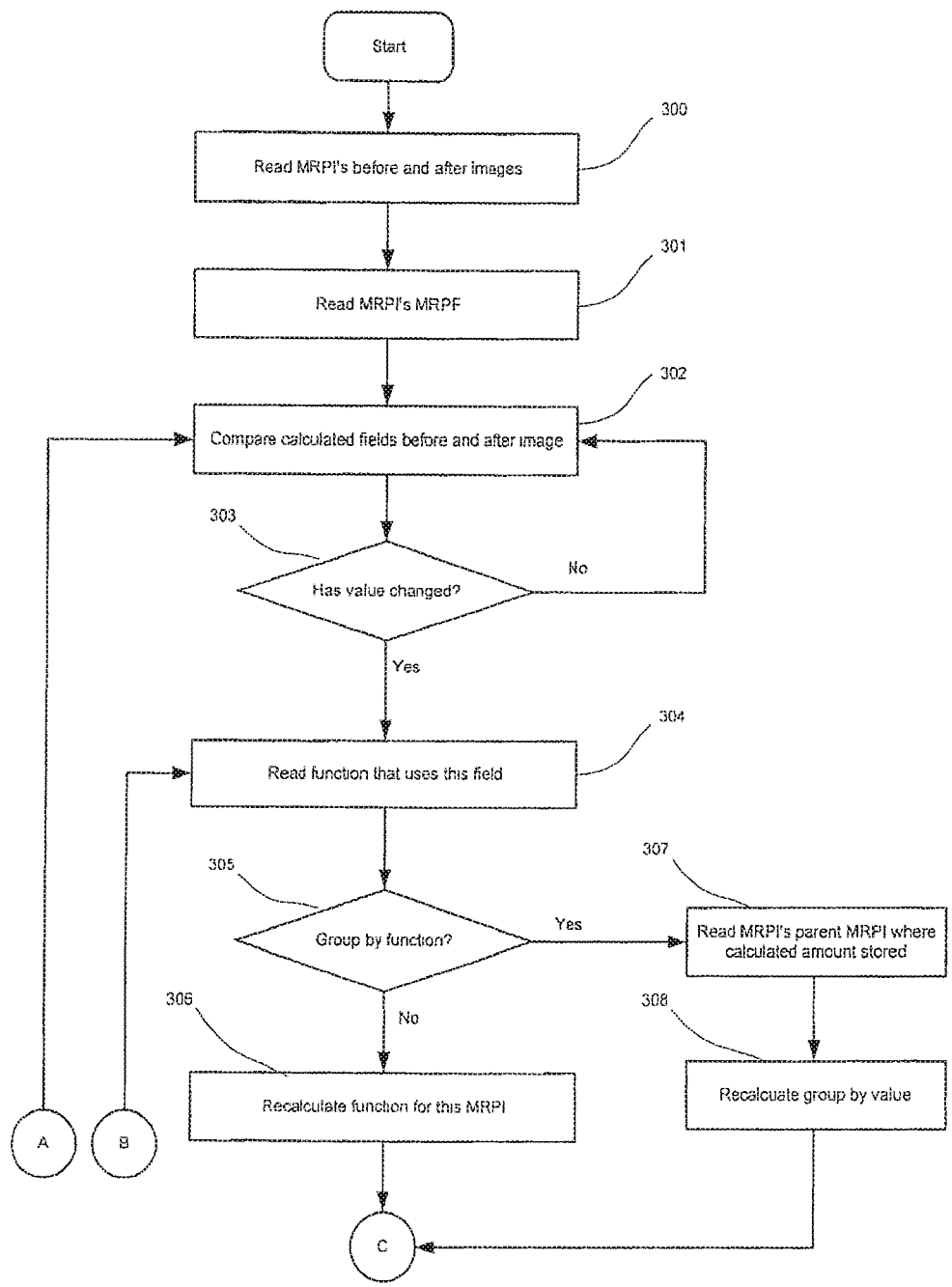
FIGS. 15A and 15B are a flowchart of the preferred method for executing a function for a changed management record pointer instance.
Figure 15B:
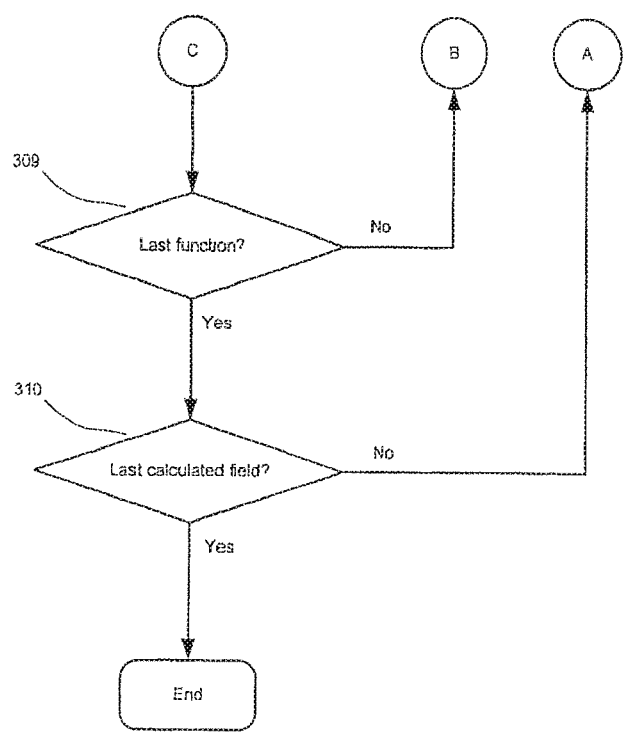

Referring now to FIGS. 15A and 15B, the preferred method for executing a function for a change to the MRPI, as used in FIG. 17 below, is described. In step 300, the images of the MRPIs before and after the changes to the MRPI are read. The present method preferably saves images of the MRPI whenever anything is changed. These images are saved until the changes have been processed. In step 301, the MRPF of the changed MRPI is read. Then in step 302, the calculated field of the before and after images are compared. In step 303, the method tests whether the value for each calculated image has changed. If there is no change, the method repeats step 302 to get the next calculated field. However, if there is a change, the method moves to step 304. In step 304, the function(s) that use this calculated field are retrieved. In step 305, the method tests whether any of the functions using this calculated field are group by functions. If a group by function is involved, the method first reads the MRPIs parent MRPI where the calculated amount is stored in step 307. Then in step 308, the group by value is recalculated. If a group by function is not involved, the method recalculates the function for this MRPI in step 306. Next in step 309, the method tests whether this is the last function affected by the change. If more functions are affected, the method returns to step 304 to process those other functions. Otherwise, the method continues to step 310 to determine if this is the last calculated field that has been modified. If there are more calculated fields to process the method returns to step 302. If not the process is complete and all the values are function value.

Figure 16A:
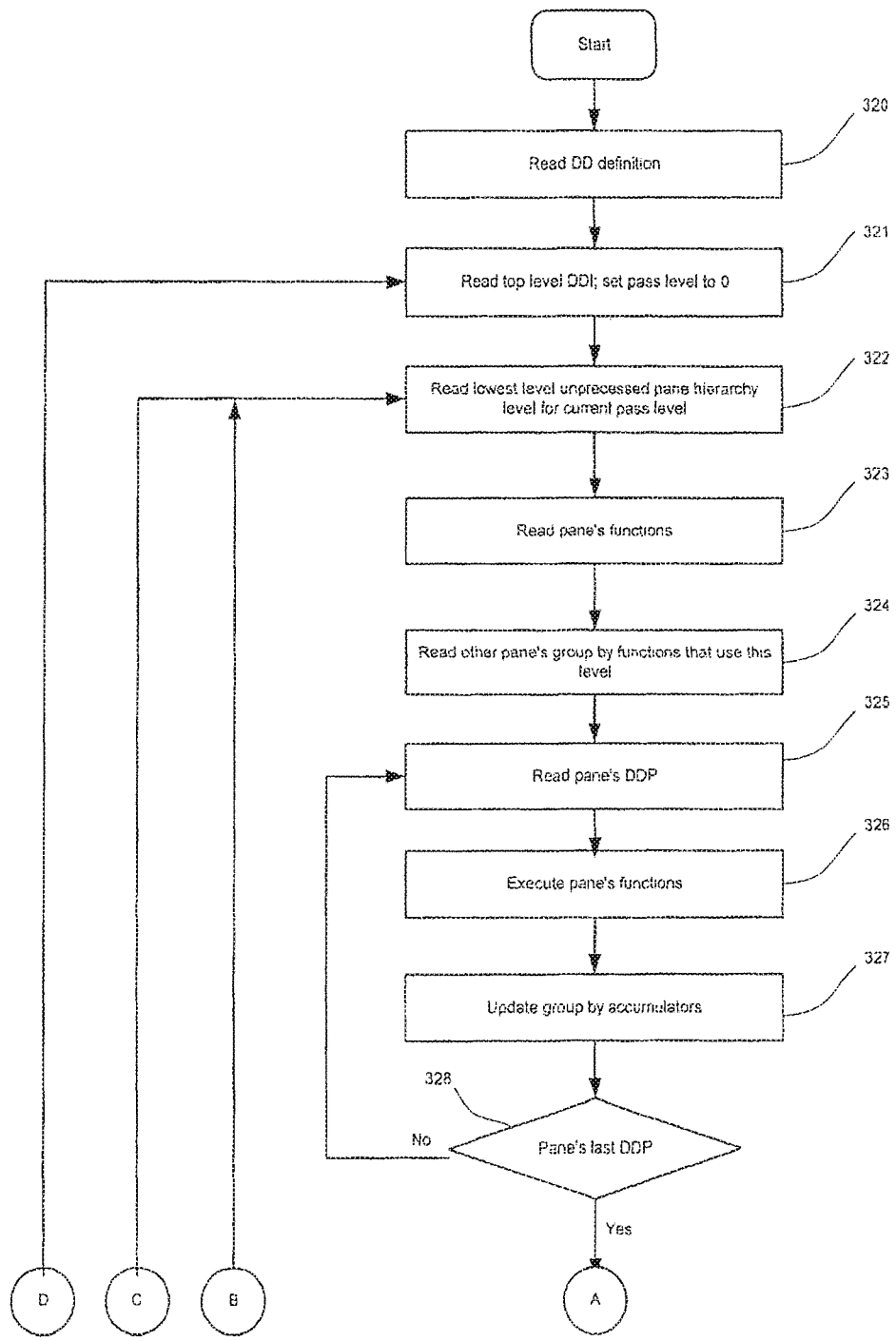
FIGS. 16A and 16B are a flowchart of the preferred method for executing a function for new dynamic document pointers.
Figure 16B:
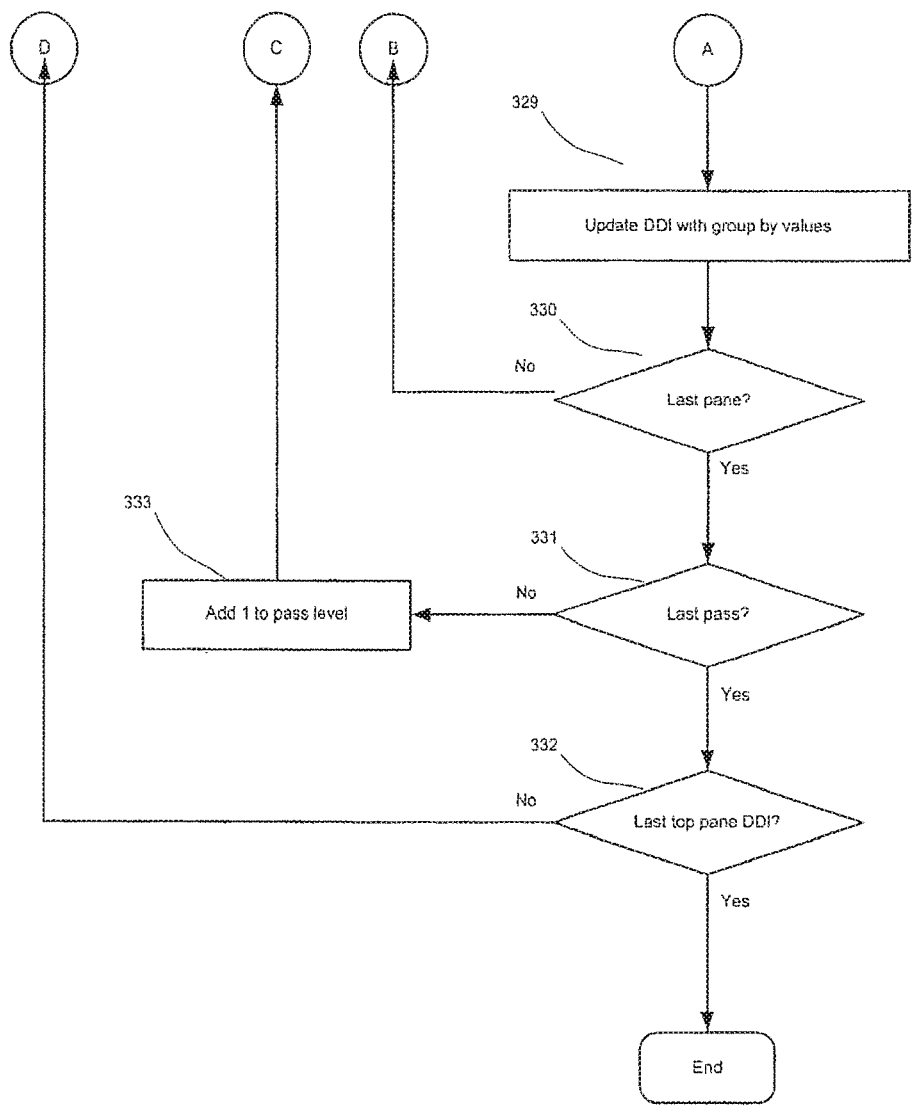

FIGS. 16A and 16B illustrate a preferred method for executing a filter for a new or changed set of DDPs. DD functions work almost identically to MRT functions. The calculation logic is the same except DDPs correspond to MRPIs. Panes correspond to MRF'Fs, and top pane DDPs correspond to MRIs. MRT functions are always executed prior to DD functions. Also, if a pane does not include in itself or its parents, the lead PRT for its own lowest level MRPFs, it must be summarized. Summarization is just the process of grouping then the pane and its parent panes. Calculated fields from the pane's MWFs must be grouped by one of the standard group by operands (See Appendix A). The user specifies the group by operand when he\she defines the DD.

The method starts in step 320 with the DD definition being read. The present invention processes each dynamic document instance (DDI) separately beginning with the lowest level panes in the pane hierarchy and working upward.

In step 231, the top-level pane DDI is read and the variable PASS LEVEL is set equal to zero. In step 322, the method reads the lowest unprocessed pane hierarchy level for this pass. In step 323, the method reads the pane's functions. Then in step 324, the method reads other pane's group by function(s) that use this level. Group by functions are executed with the pane they summarize not the pane where the result is stored. The DDPs for this pane are then read in step 325. Then in step 326, the function for this pane are executed. The group by accumulators are then updated in step 327. Next in step 328, the system determines whether the DDP being used to execute the functions is the last DDP for this pane. If not, the method returns to step 325, otherwise the process continues in step 329. In step 329, the group by accumulator values are added to the DDI. Then in step 330, the method test whether this is the last pane for this DD 20. If not, the process loops to step 322 to process any unprocessed panes, otherwise the process continues in step 331. In step 331, the method determines if this is the last pass. If it is not the last pass, then 1 is added to the PASS LEVEL in step 332 and the method returns to step 322 for further processing. After each pass of all the DDI, the method executes the functions with the next highest pass sequence number until all functions are executed. However, if it is the last pass, the method continues in step 332 where the process tests whether this is the last top DDI to perform functions for. If not, the process returns to step 321, otherwise the execution of the functions for the DD is complete.

All changes to any data is entered by the user through DDs or fetches from a production data source. All changes can affect multiple DDs and MRTs. For example, if the user changes a customer's discount percentage and multiple MRTs use that field in their calculations, the present invention must update many MRPIs and DDPs for that one change. Therefore, when the user enters a change, the present invention first updates the affected PRT and then the MRPIs and finally the DDPs that use that PRT. The updates to the MRPIs have been described above with reference to FIGS. 4 and 5.

Figure 17:
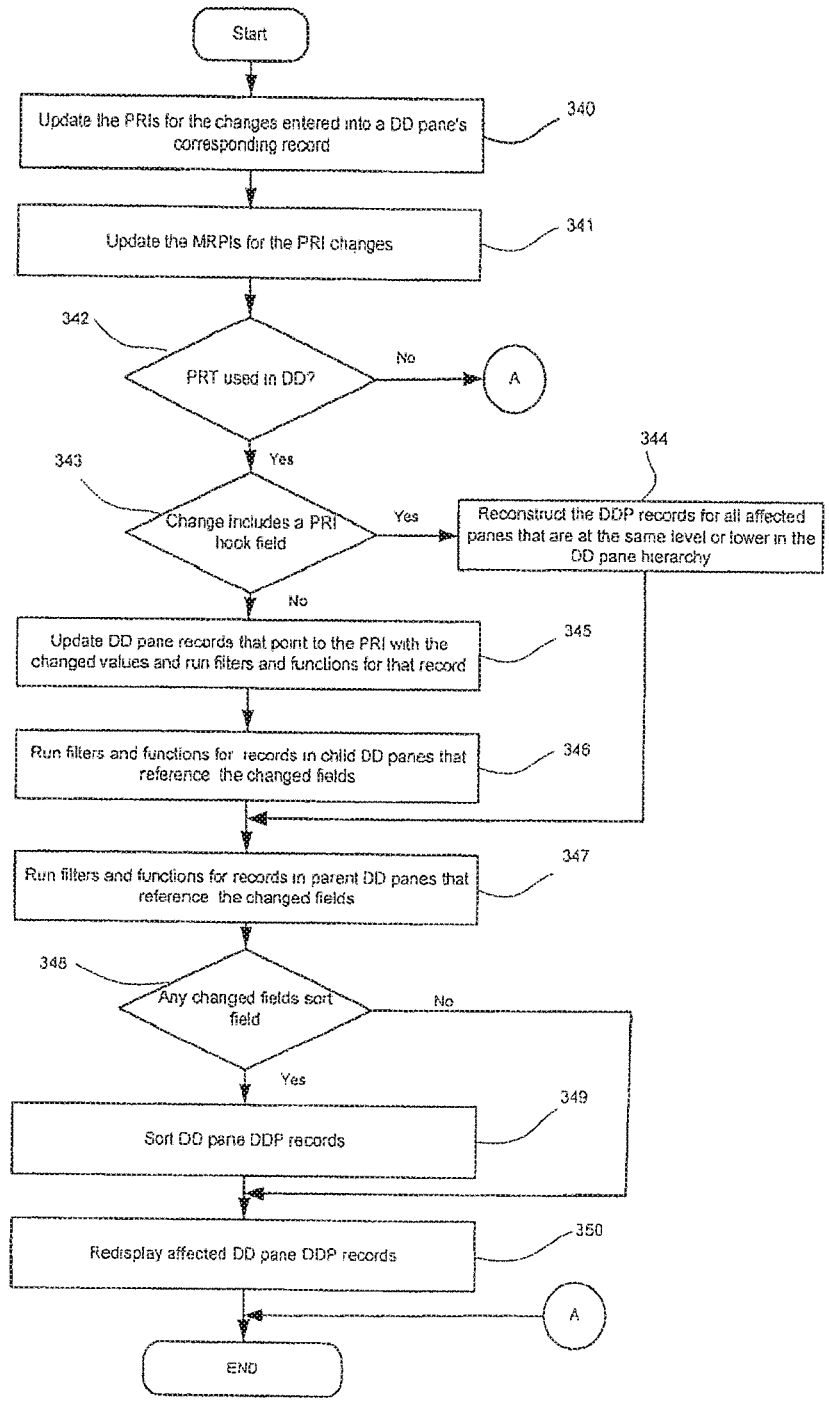
FIG. 17 is a flowchart of the preferred method for executing a function for a new or changed set of dynamic document pointers.

FIG. 17 illustrates the preferred method for updating a DD pane's dynamic documents pointers (DDPs) and the displayed records for data changes. Users enter data changes through any of a MR's DDs. Newly imported XML documents also create data changes. The preferred method identifies data changes and ensures that all affected DDP records are either updated with the new values or recreated. (The method for filtering and displaying DD pane data is described in FIG. 18.) In step 340, the method maintains PRIs for data enter through a DD or imported as XML documents. The changed values can be changes to existing PRI field values including field values that are also hooks to other PRIs, as well as changes that are also new PRIs. In step 341, the method maintains the MPRIs for the changes PRIs as described in FIG. 10 for new PRIs and FIG. 11 for existing PRIs.

Next the method checks every DD that is currently activated to determine the changes, if any to make to its DDP and the displayed records. In step 342, the method tests whether the PRT is used by the DD; if not used no further processing is done on that DD. If the DD does use the PRT, step 343 checks to see if any hook fields were changed. If so step 344 deletes all the DDP records that references the changed PRT. The method also deletes all DDP records in DD panes lower in the DD pane hierarchy than that of the affected DDP. Step 344 then it recreates the DDP records as described in FIG. 9 and proceeds to step 347. When a hook field was not changed, step 345 updates the DDP record field values with the new PRI field values and runs the DD filters and functions on the changed record. Then in step 346, the method runs the filters and functions for all records in DD panes that are lower in the DD pane hierarchy and also reference the changed DDP record. In step 347, the method runs the filters and functions for all records that are higher in the DD pane hierarchy and reference any DDP record changed by steps 344, 345, or 346. When step 348 determines the method changed any field value in a DDP record used by the sort rules, it sorts the DD pane in step 349. Finally the method redisplays all DDP records that it modified or resorted.

As an alternate method, steps that would determine which DDP records were affected by the change in a hook value could replace step 344. This alternate method would not reconstruct all the DDP records, but would modify, delete, and insert only the records required by the field value changes. This method could be more efficient when the ratio of changed DDP records to the total number of records is very low.

Figure 18A:
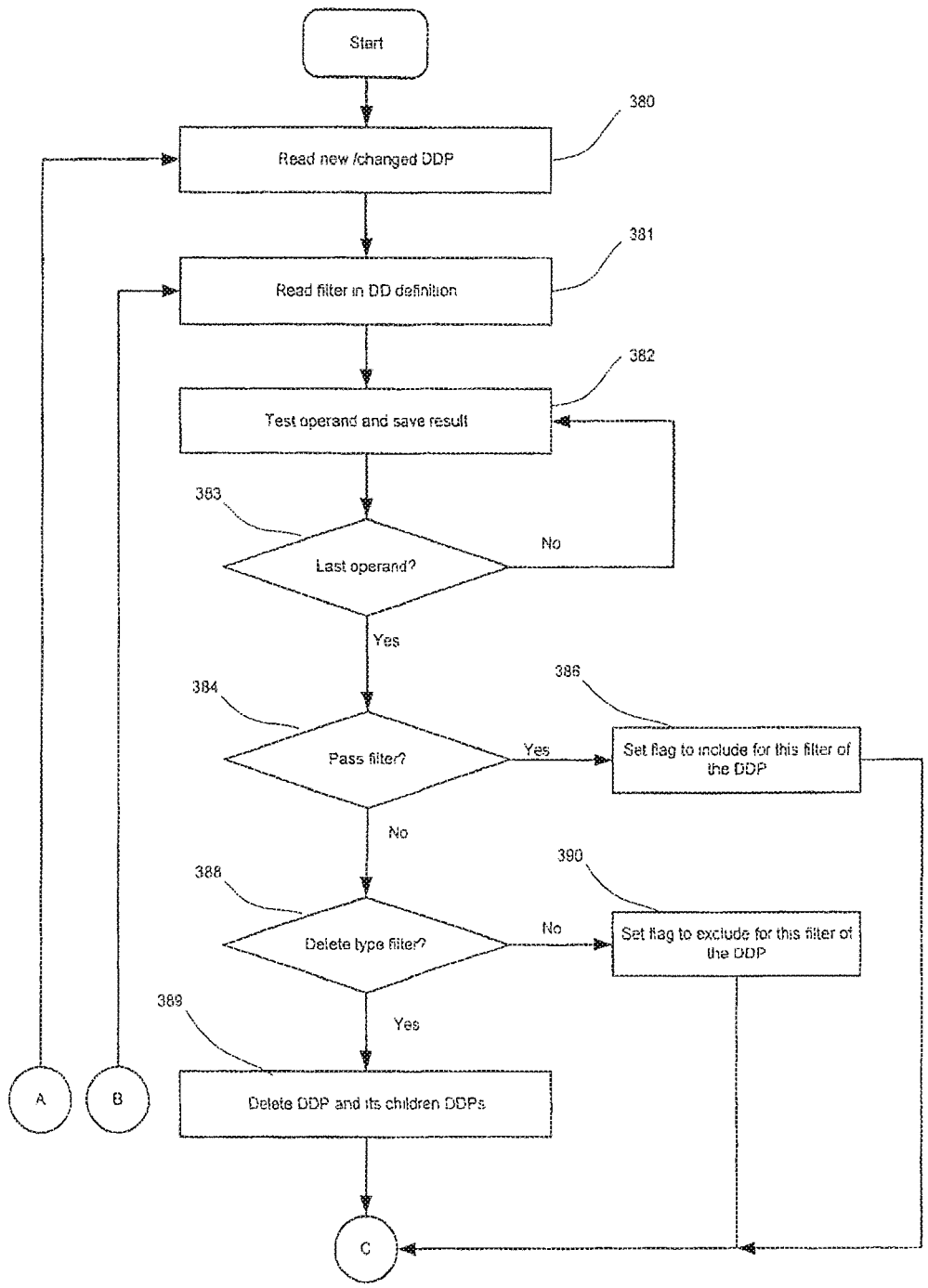
FIGS. 18A and 18B are a flowchart of the preferred method for executing a filter for a changed dynamic document pointer.
Figure 18B:
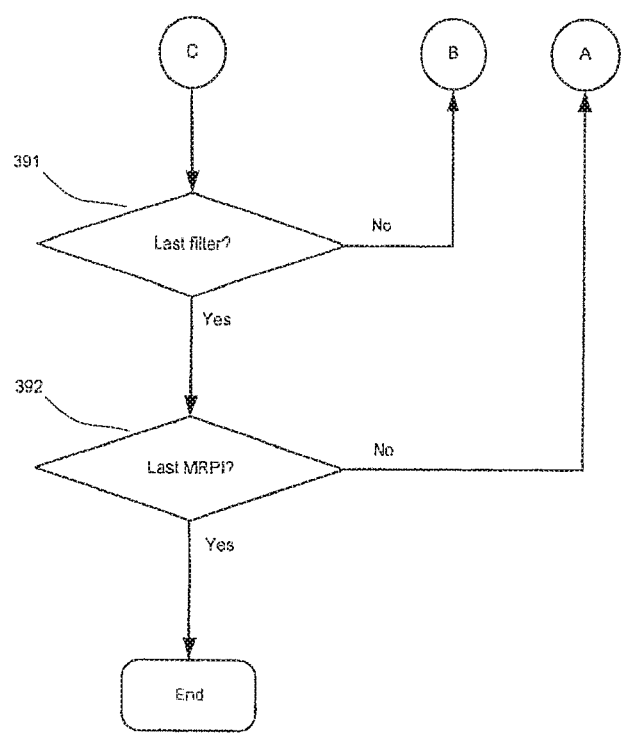

FIGS. 18A and 18B illustrate the preferred process for executing filters when a dynamic document pointer is created or revised. DDs have three sets of filters: filters for determining what data to display on the screen, filters for determining what data to print on a report, and filters to determine which changes to send to targeted production data sources. All three types of DD filters work almost identically to MRT filters. The calculation logic is the same except DDPs correspond to MRPIs, Panes correspond to MRPFs. MRT filters are always executed prior to DD filters. Unlike MRT filters, DD filters are not all executed at the same time for a single DDP. When first constructing a DD's DDPs to minimize the number of MRPFs processed in arriving at the pointers for a pane, the present invention categorizes filters into four categories and executes them at different times during the creation and updating of DDPs: 1) Prejoin filters are executed on a pane's MRPF's MRPIs prior to joining them with the other MRPIs for the pane. Filters that have operands on only the fields in the PRTs for the MRPF are in this category. Also filters which meet the first criteria and also use a calculated field from the MRPF and lead PRT for the MRPF is in the current pane or any parent pane are in this category; 2) Post join filters are executed after all of a pane's MRPIs are joined together with its parent pane's MRPIs. Filters that meet the above criteria but used fields from more than one MRPF are in this criteria; 3) Post summarize filters are executed after the joined MRPIs are summarized into Pane Pointers. Filters which do not use calculated fields from DD functions are not in either of the above two categories; and 4) Post function filters are executed after the select functions but prior to the display filters. All filters that use calculated fields that are the result of DD functions are in this category.

The process begins by reading any new or changed DDP in step 380. Then a filter from the DD definition is read in step 381. Next, in step 382, an operand is tested, and the result is saved. Since all filter operations are on fields in the DD, each DD can be fully tested to see if it should be filtered out by reading only the DDP's calculated fields. For improved processing efficiency, the present invention executes all of a DDPs filters one after the other. The operation tests are simple Boolean tests to see if the field's value equals the value stored in the list (Dynamic Document) specified. The present invention stores the result (true or false) of each operation. The method then determines if this operand is the last operand to test in step 383. If not, the process returns to step 382 to test the next operand. If all the operands have been tested, then the process continues to step 384. In the step 384, the method looks at the results of each operand to determine if the full filter results in a pass or fail. If the DDP passes the filter, the method proceeds to step 386 where the method appends to the DDP a flag, for each filter indicating the filter includes that particular DDP. If the DDP fails the filter, the method jumps to step 388 to evaluate the filter type. In step 388, further tests are performed to determine if the filter is a delete type. If the filter is a delete type, the DDP and its children DDPs are deleted in step 389. Any DDP which has any parent DDP which are excluded is itself excluded. If the filter is not a delete type, then the flag is set to exclude for this filter in the current DDP's filter affects list in step 390. Any DDP that is excluded by any active filter is not displayed in the currently open DDs. Next, step 391 determines whether there are additional filters to be processed. If so the method loops to 381, otherwise the method tests whether this is the last MRPI to be processed in step 392. If there are more MRPIs to process, the method returns to step 380, otherwise, the process is complete.

Finally, it should be understood that the present invention also uses conventional sorting and display techniques. Sorting occurs dynamically when the DDPs are joined to the PRTs and displayed as pane rows. Sorting is done pane by pane in the same manner employed by conventional report write and query tools. The rows in a pane can be sorted by any of PRT and/or calculated fields in the pane. The user specifies the order in which each field sort is executed and whether to use an ascending or descending order. The user can also specify which, if any, sort levels should have total lines and what group by operand to use for each field for each level. The user can also have the present invention suppress displaying the row details and just display the totals. When the user selects (highlights) a total row in a pane, that pane's child panes display the rows for all the parent pane's detail rows that comprise the selected total row.

The display and reporting component of the present invention works similarly to many conventional query and reporting tools. By the time the present invention hands over the data to be displayed, it has already organized it, executed its calculations, filtered and sorted it. The present invention hands over one record (a DDP and its corresponding PRIs) to the screen forms display tool. All that remains is to place the record's values in the proper fields. Display rules entered by the user control the appearance of the panes, positioning the format of the PRT's fields, and what type of maintenance users can do to actual field values.

Users can open as many DDs at once as their hardware supports. Each DD can be autonomous or any DD can be linked to another. To link DD all the user need do is specify which on PRTs within the two DDs the link occurs. The two PRTs must be hooked together, or the PRT in both DD must be identical. At least one of the DDs must be linked at its top pane and a core linked DD must be designated as the controlled DD. Any DD can have only one controlling DD and circular controls are not permitted. When the user selects a new record instance in the controlling DD, the controlled DD is updated to display the record instance(s) that are hooked to the new controlling record instance. The present invention does this by executing the "find" function on the controlled DD; the find parameter is the foreign key or pointer of the controlling DD's current record type instance.

The present invention can save all the contents of memory it is currently using as a single file. If the user wishes to leave the terminal for a while, the user can save it and then recall it whenever required. This save is not shared with other users. Multiple copies of a session can be made and later modified just like as can be done with spreadsheets an word processors. In a multiple user environment, the changes to PRTs are stored i'n a relational database or XML documents and multiple users can access those changes. The definitions of MRTs, hooks, DDs, functions, filters, and sorts are also stored in the same database in special tables or XML documents setup by the present invention. Optionally MRPIs and DDPs can also be stored and maintained by the present invention in the same relational database or XML documents. It is useful to store these pointers in the repository because they do not need to then be regenerated for each user when he/she resumes working on the shared model.

While the present invention has been described with reference to certain preferred embodiments, those skilled in the art will recognize that various modifications may be provided. For example, there may be other embodiments for the method of executing the functions, filters and sorts used in FIG. 4 in addition to those described above. Similarly, there may be other embodiments for the particular structure used for the MRTs, the pointer families, and DDs. These and other variations upon and modifications to the preferred embodiment are provided for by the present invention that is limited only by the following claims.

What is claimed:

1. A method of integrating Extensible Markup Language (XML) with relational data, the method comprising:
    managing an integrated data set comprising a combination of relational-model data type definitions and XML definitions, wherein managing the integrated data set facilitates storage and retrieval of relational-model data type definitions, XML definitions, data attributes, and documents;
    receiving, from a plurality of sources, data in XML format, wherein at least a portion of the received data is stored as part of the integrated data set, wherein the plurality of sources comprise a first source and a second source, and wherein the first source and the second source, respectively, comprise at least one of: (i) an XML document, (ii) a relational database, or (iii) an object oriented input;
    decomposing at least a subset of the data provided by the plurality of sources into data attributes, wherein the decomposing is based, at least in part, on decomposing rules associated with the managed integrated data set; and
    generating at least one document in at least one XML format or an XML-like format based at least in part, on composing rules associated with the managed integrated data set, wherein the composing rules are for composing the at least one document included in the integrated data set, and wherein the at least one document includes data attributes from the decomposed data.

2. The method of claim 1, wherein the data is stored in a database.

3. The method of claim 2, wherein the database comprises at least one of a relational database or an object-oriented database.

4. The method of claim 2, wherein the database is located in a web server.

5. The method of claim 1, further comprising:
receiving a request to create a new data attribute for inclusion in the integrated data set; and
creating a new rule for decomposing data provided by the plurality of sources into the new data attribute in the integrated data set based at least in part on the request.

6. The method of claim 1, further comprising adding the at least one document to the plurality of sources.

7. The method of claim 1, wherein the at least one document is associated with performing hierarchical-style analytics.

8. The method of claim 1, wherein the at least one document is associated with performing XML data mining.

9. The method of claim 1, wherein the at least one document is associated with performing statistical analysis.

10. The method of claim 1, wherein the at least one document is associated with filtering data.

11. The method of claim 1, wherein the at least one document is associated with an application for integrating services across at least two enterprises.

12. The method of claim 1, wherein the integrated data set comprises primary record types corresponding to data extracted in XML format, management record definitions corresponding to business objects, and document data definitions including at least one of a relational data model, an object data model, or an XML data model.

13. The method of claim 1, further comprising generate instance data structures for storing data obtained from a source, the instance data structures comprising:
one or more primary record instances,
one or more management record instances, and
one or more document data instances.

14. A system for integrating Extensible Markup Language (XML) with relational data, the system comprising:
means for managing an integrated data set comprising a combination of relational-model data type definitions and XML definitions, wherein managing the integrated data set facilitates storage and retrieval of relational-model data type definitions, XML definitions, data attributes, and documents;
means for receiving, from a plurality of sources, data in XML format, wherein at least a portion of the received data is stored as part of the integrated data set, wherein the plurality of sources comprise a first source and a second source, and wherein the first source and the second source, respectively, comprise at least one of: (i) an XML document, (ii) a relational database, or (iii) an object oriented input;
means for decomposing at least a subset of the data provided by the plurality of sources into data attributes, wherein the decomposing is based, at least in part, on decomposing rules associated with the managed integrated data set; and
means for generating at least one document in at least one XML format or an XML-like format based at least in part, on composing rules associated with the managed integrated data set, wherein the composing rules are for composing the at least one document included in the integrated data set, and wherein the at least one document includes data attributes from the decomposed data.

15. The system of claim 14, wherein the data is stored in a data repository comprising a relational database.

16. The system of claim 14, wherein the data is stored in a data repository comprising an object-oriented database.

17. The system of claim 14, wherein the system further comprises a database.

18. The system of claim 14, wherein the system is a web server.

19. The system of claim 14, wherein the system further comprises:
means for receiving a request to create a new data attribute for inclusion in the integrated data set; and
means for creating a new rule for decomposing data provided by the plurality of sources into the new data attribute in the integrated data set based at least in part on the request.

20. The system of claim 14, wherein the decomposing rules comprise a processing rule indicating how a change to data included in the integrated data set affects a source of the data.

21. The system of claim 14, wherein the integrated data set comprises primary record types corresponding to data extracted in XML format, management record definitions, and document data definitions including at least one of a relational data model, an object data model, or an XML data model.

* * * * *